US 8,070,269 B2

(12) United States Patent
Katada et al.

(10) Patent No.: US 8,070,269 B2
(45) Date of Patent: Dec. 6, 2011

(54) LIQUID STORAGE APPARATUS AND IMAGE FORMING APPARATUS

(75) Inventors: Masahito Katada, Kanagawa-ken (JP); Tsutomu Takatsuka, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1186 days.

(21) Appl. No.: 11/802,517

(22) Filed: May 23, 2007

(65) Prior Publication Data

US 2007/0280722 A1 Dec. 6, 2007

(30) Foreign Application Priority Data

Jun. 2, 2006 (JP) ................................. 2006-155118

(51) Int. Cl.
*B41J 2/175* (2006.01)
(52) U.S. Cl. .......................................... 347/85; 417/472
(58) Field of Classification Search ................... 347/49, 347/85, 86, 87
See application file for complete search history.

(56) References Cited

U.S. PATENT DOCUMENTS

| | | | | |
|---|---|---|---|---|
| 5,045,064 A | * | 9/1991 | Idriss | 604/132 |
| 5,659,171 A | * | 8/1997 | Young et al. | 250/289 |
| 5,675,367 A | * | 10/1997 | Scheffelin et al. | 347/86 |
| 5,886,719 A | * | 3/1999 | Zepeda | 347/85 |
| 6,123,414 A | * | 9/2000 | Choi | 347/54 |
| 6,130,689 A | * | 10/2000 | Choi | 347/54 |
| 6,158,851 A | * | 12/2000 | Zepeda | 347/85 |

(Continued)

FOREIGN PATENT DOCUMENTS

JP 62-253465 A 11/1987

(Continued)

*Primary Examiner* — Charlie Peng
*Assistant Examiner* — Peter Radkowski
(74) *Attorney, Agent, or Firm* — Birch, Stewart, Kolasch & Birch, LLP

(57) ABSTRACT

The liquid storage apparatus includes: a liquid storage chamber which is constituted by a flexible bag member and stores liquid; an exterior container which has walls constituted by a shape memory member and has a hermetically sealed space in which the liquid storage chamber is disposed, the shape memory member extending and contracting freely at temperatures not greater than a transformation temperature and recovering a memorized shape at temperatures not less than a shape recovery temperature; a forcing member which applies a contraction force to the walls of the exterior container in a direction in which the walls contract; and a temperature adjuster which adjusts a temperature of the shape memory member directly or indirectly so as to control a ratio of a portion of the shape memory member having temperatures not greater than the transformation temperature and deformed to a contracted shape by the contraction force of the forcing member and a ratio of a portion of the shape memory member having temperatures not less than the shape recovery temperature and recovering the memorized shape more extended than the contracted shape, so that a pressure in the liquid storage chamber is changed depending on a volume change of the exterior container due to deformation of the shape memory member.

12 Claims, 16 Drawing Sheets

U.S. PATENT DOCUMENTS

| | | | |
|---|---|---|---|
| 6,323,459 B1 * | 11/2001 | Maynard | 219/209 |
| 7,022,107 B1 * | 4/2006 | Christensen et al. | 604/141 |
| 7,232,208 B2 * | 6/2007 | Silverbrook | 347/86 |
| 2003/0198558 A1 * | 10/2003 | Nason et al. | 417/53 |
| 2003/0208184 A1 * | 11/2003 | Burke et al. | 604/891.1 |
| 2004/0085402 A1 * | 5/2004 | Silverbrook | 347/54 |
| 2004/0145638 A1 * | 7/2004 | Martinez-Pacheco | 347/87 |
| 2005/0156997 A1 * | 7/2005 | Silverbrook | 347/34 |
| 2005/0219337 A1 | 10/2005 | Martinez-Pacheco | |
| 2006/0006108 A1 * | 1/2006 | Arias et al. | 210/232 |
| 2006/0013716 A1 * | 1/2006 | Nason et al. | 417/437 |
| 2006/0221153 A1 * | 10/2006 | Kojima et al. | 347/86 |
| 2006/0229174 A1 * | 10/2006 | Bonutti | 482/111 |
| 2006/0260534 A1 * | 11/2006 | Petrakis | 116/216 |
| 2007/0126806 A1 * | 6/2007 | Silverbrook et al. | 347/84 |

FOREIGN PATENT DOCUMENTS

| | | |
|---|---|---|
| JP | 02261078 A * | 10/1990 |
| JP | 2004-174815 A | 6/2004 |
| JP | 2004-230890 A | 8/2004 |
| JP | 2005-35025 A | 2/2005 |
| JP | 2006-1123 A | 1/2006 |
| SU | 1141471 A * | 2/1985 |

* cited by examiner

FIG.3
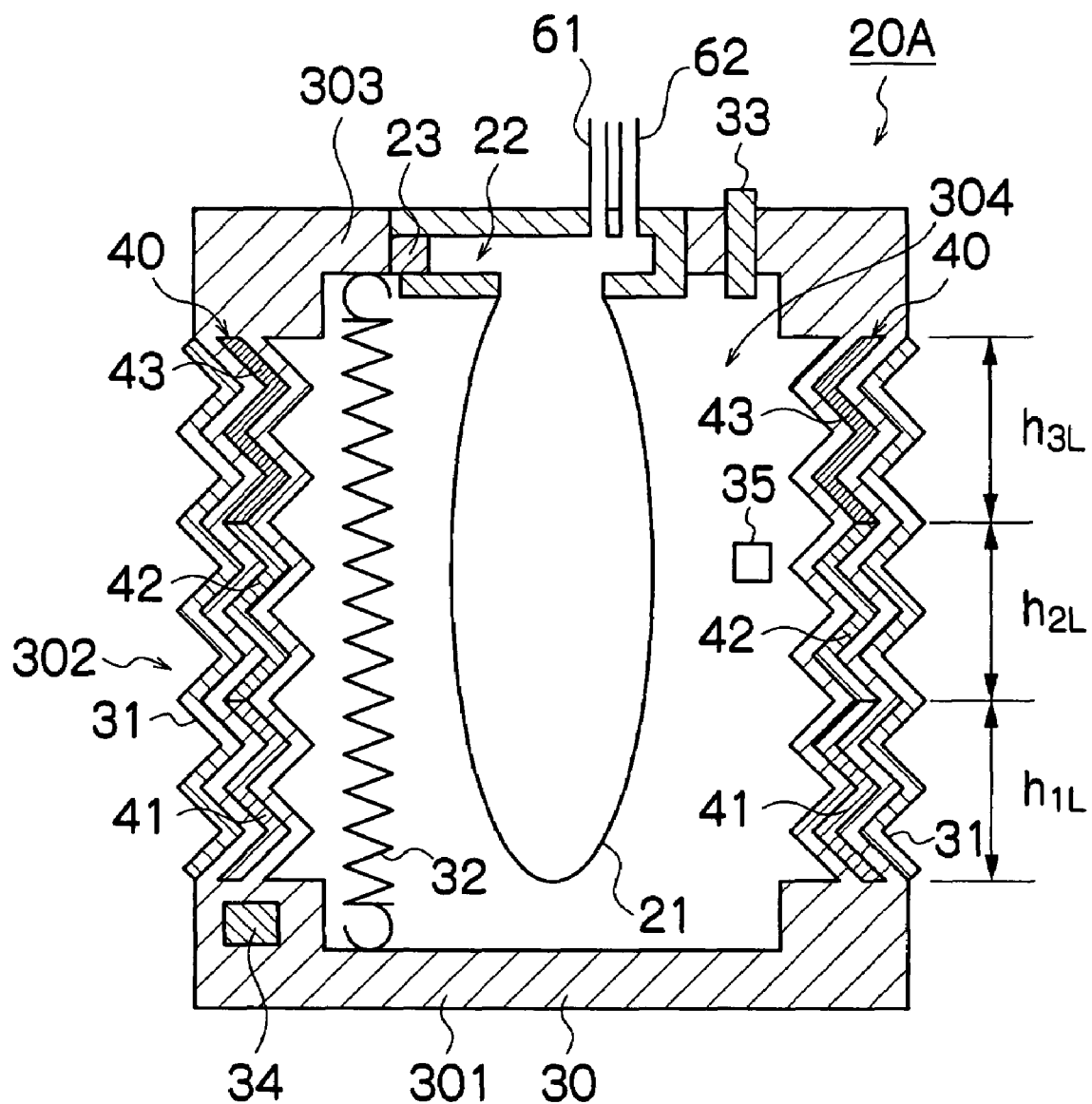
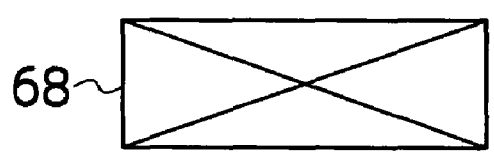

FIG.4
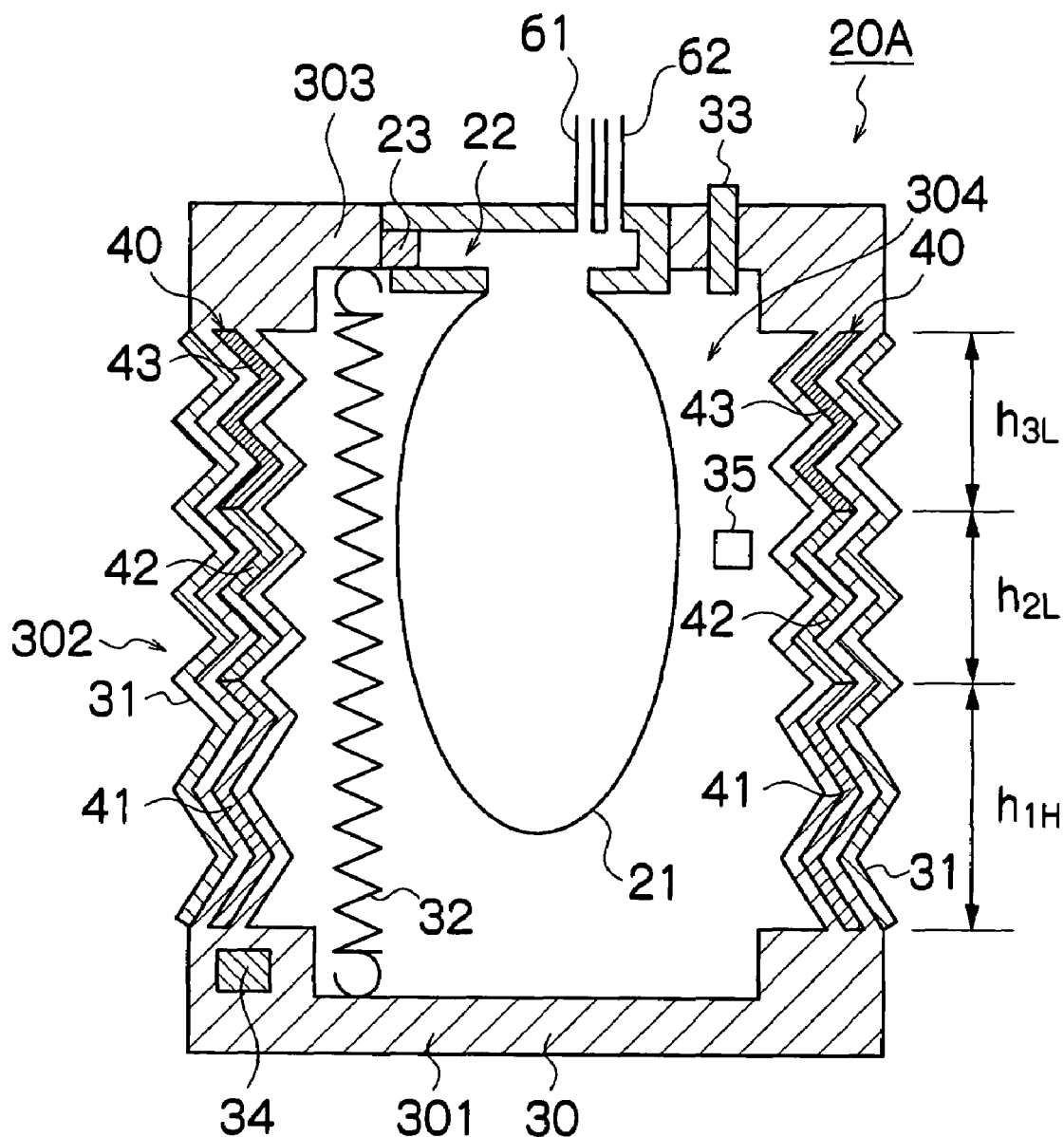
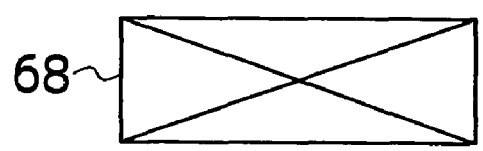

FIG.13
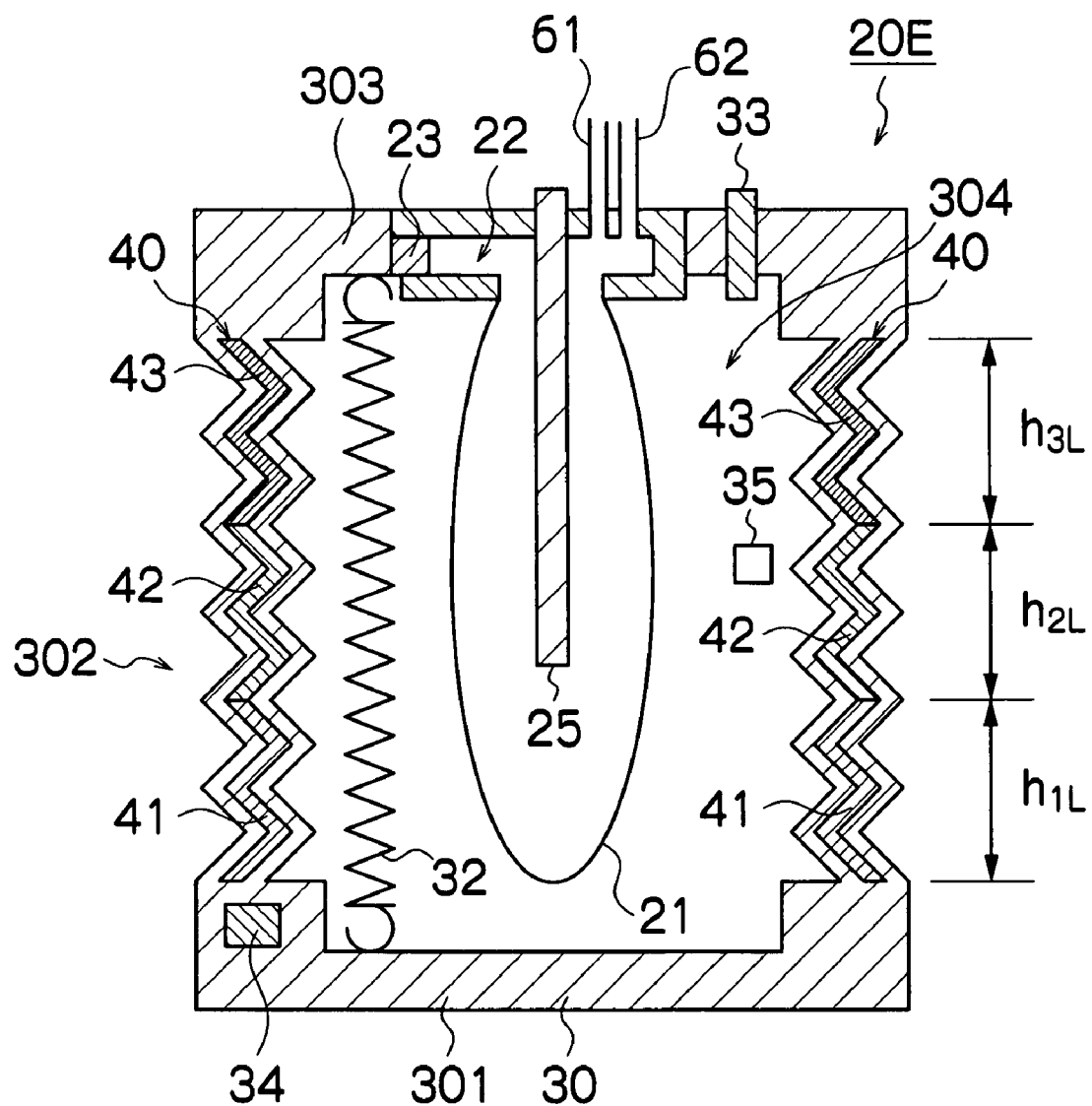
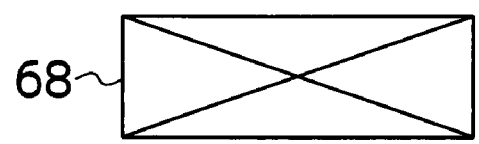

LIQUID STORAGE APPARATUS AND IMAGE FORMING APPARATUS

BACKGROUND OF THE INVENTION

1. Field of the Invention

The present invention relates to a liquid storage apparatus for storing liquid, and to an image forming apparatus including this liquid storage apparatus.

2. Description of the Related Art

Various types of liquid storage apparatuses for storing ink to be supplied to an ink ejection head are known. An ink ejection head ejects ink supplied from the liquid storage apparatus toward an ejection receiving medium, such as paper, and forms images on the ejection receiving medium.

Japanese Patent Application Publication No. 2004-230890 discloses an ink cartridge comprising: a housing which defines a first fluid tank; an air management system having an attachment to be supported by the housing; and an expansible bladder which defines a second fluid tank and which is supported by the attachment within the first fluid tank. The expansible bladder is configured to expand to thereby increase the second fluid tank from a first volume to a second volume. The expansible bladder is fabricated from a material having a shape-memory to thereby bias the expansible bladder toward the first volume.

Japanese Patent Application Publication No. 2004-174815 discloses technology in which an elevator unit arranged inside an ink accommodating unit balances with the weight of an ink tank by means of a spring. More specifically, the ink tank is supported by a movable supporting member and a compression coil spring arranged between the ink tank and the movable supporting member. The ink tank is raised or lowered on the basis of the balance between the elastic force of the spring and the gravitational force on the ink inside the ink tank, so that the water head difference does not change even if there is a variation in the weight of ink.

In the technology described in Japanese Patent Application Publication No. 2004-230890, a slight negative pressure is generated in the ink chambers by using the expansion of the expansible bladder due to elastic deformation. Generally, in the case of an ink tank having a small capacity, the negative pressure can be created within an appropriate range until the ink is consumed. On the other hand, in the case of an ink tank having a large capacity, since the force generated by the elastic deformation increases, then the negative pressure exceeds the appropriate limit and the ejection state of the ink ejection head is thus affected, leading to a decline in print quality.

In industrial applications, various liquids having different physical properties, such as a specific gravity, viscosity, surface tension, and the like, are used. Possible examples of such liquids include: aqueous inks, oil-based inks, photocurable liquids, metal pastes, and the like. In the technology described in Japanese Patent Application Publication No. 2004-174815, if the liquid used is changed to another liquid having a different specific gravity, then the height of the ink tank depends on the balance between the elastic force of the spring and the gravitational force on the liquid, and therefore the position of the liquid surface will vary depending on the specific gravity of the liquid used.

SUMMARY OF THE INVENTION

The present invention has been contrived in view of the foregoing circumstances, an object thereof being to provide a liquid storage apparatus configured to supply liquid in a stable fashion, and an image forming apparatus including this liquid storage apparatus.

In order to attain the aforementioned object, the present invention is directed to a liquid storage apparatus, comprising: a liquid storage chamber which is constituted by a flexible bag member and stores liquid; an exterior container which has walls constituted by a shape memory member and has a hermetically sealed space in which the liquid storage chamber is disposed, the shape memory member extending and contracting freely at temperatures not greater than a transformation temperature and recovering a memorized shape at temperatures not less than a shape recovery temperature; a forcing member which applies a contraction force to the walls of the exterior container in a direction in which the walls contract; and a temperature adjuster which adjusts a temperature of the shape memory member directly or indirectly so as to control a ratio of a portion of the shape memory member having temperatures not greater than the transformation temperature and deformed to a contracted shape by the contraction force of the forcing member and a ratio of a portion of the shape memory member having temperatures not less than the shape recovery temperature and recovering the memorized shape more extended than the contracted shape, so that a pressure in the liquid storage chamber is changed depending on a volume change of the exterior container due to deformation of the shape memory member.

In this aspect of the invention, the portion of the shape memory member which has temperatures not greater than the transformation temperature and extends and contracts freely, is contracted due to the contraction force of the forcing member. In accordance with this contraction, the capacity of the external container is decreased and the capacity of the liquid storage chamber is also decreased. In this case, the pressure inside the liquid storage chamber is increased. On the other hand, the shape recovery portion of the shape memory member having temperatures not less than the shape recovery temperature extends and recovers the specific memorized shape. In accordance with this extension, the capacity of the external container is increased, and the capacity of the liquid storage chamber is also increased. In this case, the pressure inside the liquid storage chamber is decreased. By the temperature distribution adjustment by means of the temperature adjuster, it is possible to change the ratio of the portion of the shape memory member having temperatures not greater than the transformation temperature and contracted by the contraction force of the forcing member, and the ratio of the portion of the shape memory member having temperatures not less than the shape recovery temperature and recovering the memorized shape more extended than the shape at a temperature not greater than the transformation temperature. Consequently, even in the case of the liquid storage chamber having a large capacity, it is possible to create an appropriate pressure inside the liquid storage chamber and to thereby supply the liquid in a stable fashion.

Preferably, the liquid storage apparatus further comprises: a pressure sensor which measures at least one of a pressure in the hermetically sealed space of the external container and the pressure in the liquid storage chamber; a temperature sensor which measures at least one of a temperature of the external container and a temperature of the liquid stored in the liquid storage chamber; and a control unit which controls the temperature adjuster to adjust the temperature of the shape memory member according to the at least one of the pressure in the hermetically sealed space and the pressure in the liquid storage chamber measured by the pressure sensor and the at least one of the temperature of the external container and the temperature of the liquid in the liquid storage chamber measured by the temperature sensor in such a manner that the at least one of the pressure in the hermetically sealed space and the pressure in the liquid storage chamber measured by the pressure sensor falls within a target range.

Preferably, the shape memory member of the external container is formed into a concertina shape.

Preferably, the temperature adjuster includes an electrical heater arranged on the walls of the external container.

In this aspect of the invention, the walls of the external container are heated, and consequently it is possible to cause the shape memory member constituting the walls to deform more efficiently, and also possible to improve the accuracy of the control of the pressure inside the liquid storage chamber and to improve the responsiveness to the pressure change in the liquid storage chamber. Furthermore, in this aspect of the invention, a single electrical heater is sufficient to adjust the temperature of the liquid inside the liquid storage chamber and to adjust the pressure of the interior of the liquid storage chamber in accordance with the deformation of the shape memory member, and an inexpensive composition can therefore be achieved.

Preferably, the temperature adjuster includes a first electrical heater arranged on the walls of the external container and a second electrical heater arranged in the liquid storage chamber.

In this aspect of the invention, the walls of the external container is heated, and consequently it is possible to cause the shape memory member constituting the walls to be deformed more efficiently, and also possible to improve the accuracy of the control of the pressure inside the liquid storage chamber and to improve the responsiveness to the pressure change in the liquid storage chamber. Furthermore, since the external container and the liquid inside the liquid storage chamber are heated by the first and second heaters, respectively, then it is also possible to reduce the temperature variation in the liquid inside the liquid storage chamber.

Preferably, the temperature adjuster includes an electrical heater arranged in the liquid storage chamber; and the shape memory member of the external container is heated indirectly by the electrical heater.

In this aspect of the invention, a single electrical heater is sufficient to adjust the temperature of the liquid inside the liquid storage chamber and to adjust the pressure of the interior of the liquid storage chamber in accordance with the deformation of the shape memory member, and an inexpensive composition can therefore be achieved.

Preferably, the shape memory member of the external container is formed by joining together a plurality of members made from shape memory materials having mutually different shape recovery temperatures.

In this aspect of the invention, a single temperature adjuster is sufficient to adjust the pressure inside the liquid storage chamber.

Preferably, the electrical heater arranged on the walls of the external container is constituted by electrical heating wires of which density is changed from one end to another end.

In this aspect of the invention, a single type of shape memory member (a shape memory member made of a single material) is sufficient to adjust the pressure inside the liquid storage chamber. Furthermore, the power consumption of the whole electrical heater can be reduced, and power savings can therefore be achieved.

In order to attain the aforementioned object, the present invention is also directed to a liquid storage apparatus comprising: a liquid storage container having walls constituted by a shape memory member which extends and contracts freely at temperatures not greater than a transformation temperature and recovers a memorized shape at temperatures not less than a shape recovery temperature, the liquid storage container storing liquid which comes into contact with the walls; a forcing member which applies a contraction force to the walls of the liquid storage container; and a temperature adjuster which adjusts temperature of the shape memory member directly or indirectly so as to control a ratio of a portion of the shape memory member having temperatures not greater than the transformation temperature and deformed to a contracted shape by the contraction force of the forcing member and a ratio of a portion of the shape memory member having temperatures not less than the shape recovery temperature and recovering the memorized shape more extended than the contracted shape, so that level of the liquid stored in the liquid storage container is changed depending on deformation of the shape memory member.

In a composition of this kind, the extensible portion of the shape memory member having temperatures not greater than the transformation temperature is contracted due to the contraction force of the forcing member, and in accordance with this contraction, the liquid surface inside the liquid storage container is raised. On the other hand, the shape recovery portion of the shape memory member having temperatures not less than the shape recovery temperature extends and recovers the memorized shape, and in accordance with this extension, the liquid surface inside the liquid storage container is lowered. By the temperature distribution adjustment by means of the temperature adjuster, it is possible to change the ratio of the portion of the shape memory member having temperatures not greater than the transformation temperature and contracted by the contraction force of the forcing member, and the ratio of the portion of the shape memory member having temperatures not less than the shape recovery temperature and recovering the memorized shape more extended than the shape at a temperature not greater than the transformation temperature. Thereby, it is possible to set the liquid surface inside the liquid storage container to an appropriate height, and hence the liquid can be supplied in a stable fashion.

In order to attain the aforementioned object, the present invention is also directed to an image forming apparatus comprising: any one of the liquid storage apparatuses described above; and a liquid ejection head which ejects the liquid supplied from the liquid storage apparatus, toward an ejection receiving medium.

In this aspect of the invention, it is possible to supply liquid stably from the liquid storage apparatus to the liquid ejection head, and therefore it is possible to prevent the occurrence of variations in the ejection performance of the liquid ejection head and to thereby prevent decline in the print quality.

According to the present invention, it is possible to adjust the pressure of the stored liquid or the height of the liquid surface appropriately, and hence liquid can be supplied in a stable fashion.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 3 is a first cross-sectional diagram showing the internal structure of the liquid storage apparatus according to a first embodiment;

FIG. 4 is a second cross-sectional diagram showing the internal structure of the liquid storage apparatus according to the first embodiment;

FIG. 13 is a cross-sectional diagram showing the internal structure of the liquid storage apparatus according to a fifth embodiment;

DETAILED DESCRIPTION OF THE PREFERRED EMBODIMENTS

Figure 1:
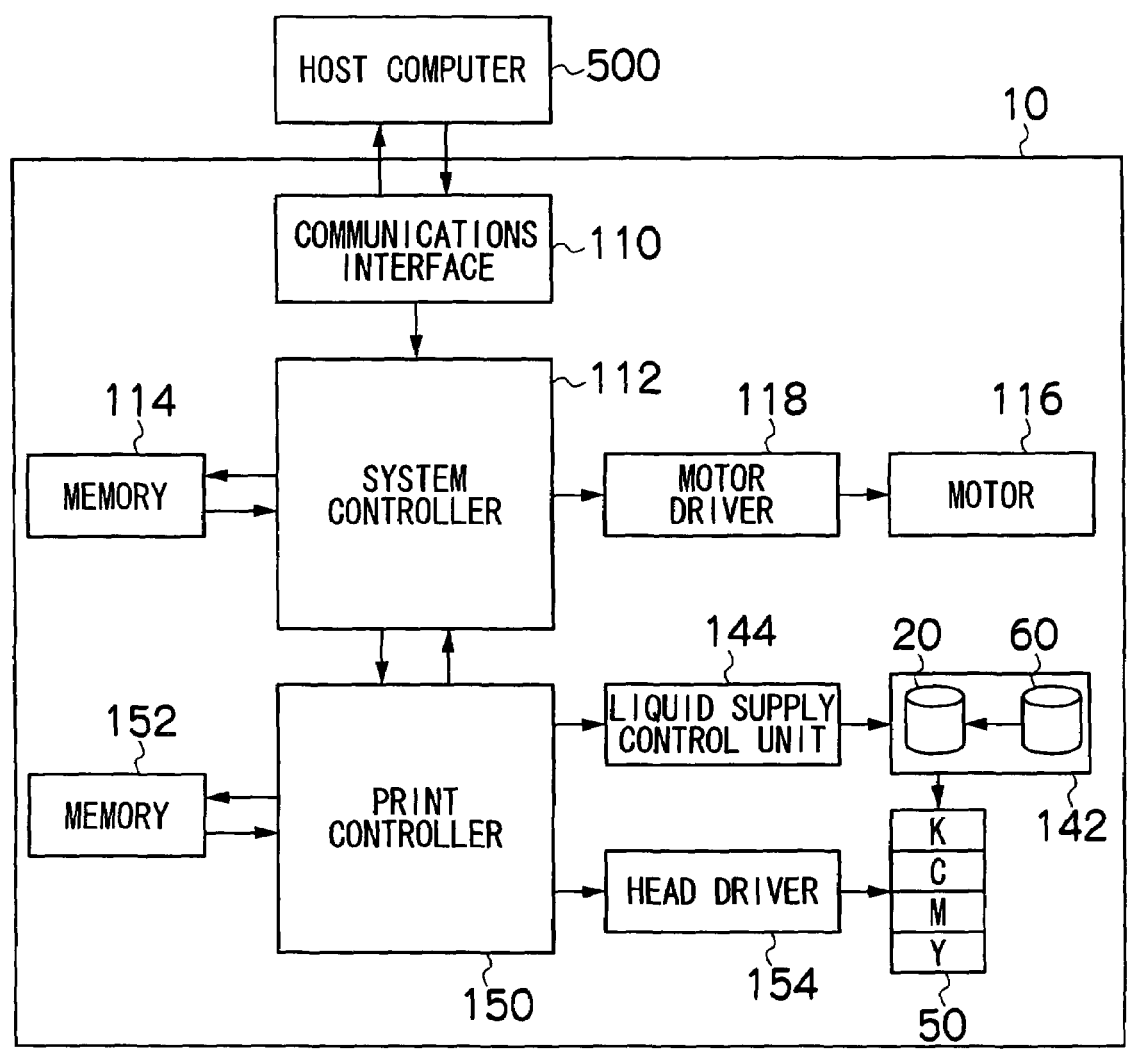
FIG. 1 is a block diagram showing the general composition of an image forming apparatus including the liquid storage apparatus according to an embodiment of the present invention.

FIG. 1 is a block diagram showing the general composition of an image forming apparatus 10 including the liquid storage apparatus according to an embodiment of the present invention.

As shown in FIG. 1, the image forming apparatus 10 principally includes: liquid ejection heads 50; a communications interface 110; a system controller 112; memories 114 and 152; an ejection receiving medium conveyance motor 116; a motor driver 118; a liquid supply unit 142; a liquid supply control unit 144; a print controller 150; and a head driver 154.

Each liquid ejection head 50 has a plurality of nozzles arranged in a two-dimensional configuration, and the liquid ejection head 50 is configured to eject ink from the nozzles. The image forming apparatus 10 according to the present embodiment includes a total of four liquid ejection heads respectively corresponding to ink colors of black (K), cyan (C), magenta (M), and yellow (Y).

The communications interface 110 receives image data transmitted from a host computer 500. For the communications interface 110, a wired or wireless interface, such as a USB (Universal Serial Bus), IEEE 1394, or the like, can be used. The image data acquired by the image forming apparatus 10 via this communications interface 110 is stored temporarily in the first memory 114 for storing image data.

The system controller 112 is constituted by a microcomputer and peripheral circuits thereof, and the like, and it controls the whole of the image forming apparatus 10 in accordance with prescribed programs. More specifically, the system controller 112 controls various parts, such as the communications interface 110, the motor driver 118, the print controller 150, and the like.

The ejection receiving medium conveyance motor 116 supplies a motive force to the roller and belt, and the like, in order to convey the ejection receiving medium, such as paper. The ejection receiving medium and the liquid ejection heads 50 are moved relative to each other, by means of this motor 116. The motor driver 118 is a circuit which drives the ejection receiving medium conveyance motor 116 in accordance with instructions from the system controller 112.

The liquid supply unit 142 includes: a main tank 60 forming an ink supply source; and a sub tank 20 which forms a liquid storage apparatus according to the present invention and which temporarily stores ink to be supplied to the liquid ejection head 50. The liquid supply unit 142 is described in detail below.

The liquid supply control unit 144 is constituted by a microcomputer and peripheral circuits thereof, and the like, and the liquid supply control unit 144 controls the liquid supply unit 142 to supply ink to the liquid ejection head 50 in accordance with a prescribed program.

The print controller 150 is constituted by a microcomputer and peripheral circuits thereof, and the like, and the print controller 150 controls the various sections, such as the liquid supply control unit 144 and the head driver 154, in accordance with prescribed programs. The print controller 150 generates the data (dot data) necessary for forming dots on the ejection receiving medium on the basis of the image data input to the image forming apparatus 10, and the liquid ejection heads 50 eject liquid droplets toward the ejection receiving medium using the dot data thus generated. More specifically, in accordance with the control of the system controller 112, the print controller 150 generates dot data for droplet ejection from the image data stored in the first memory 114, and the print controller 150 then supplies the dot data thus generated to the head driver 154. The second memory 152 is appended to the print controller 150, and the second memory 152 temporarily stores the dot data and the like when the print controller 150 implements the image processing.

The head driver 154 outputs ejection drive signals to the liquid ejection heads 50 on the basis of the dot data supplied by the print controller 150 (in practice, the dot data stored in the second memory 152). By supplying the ejection drive signals output from the head driver 154, to the liquid ejection heads 50, liquid (droplets) are ejected from the liquid ejection heads 50 toward the ejection receiving medium.

In FIG. 1, a system controller 112, a liquid supply control unit 144, and a print controller 150 are depicted separately, but these units may be constituted by one microcomputer.

Figure 2:
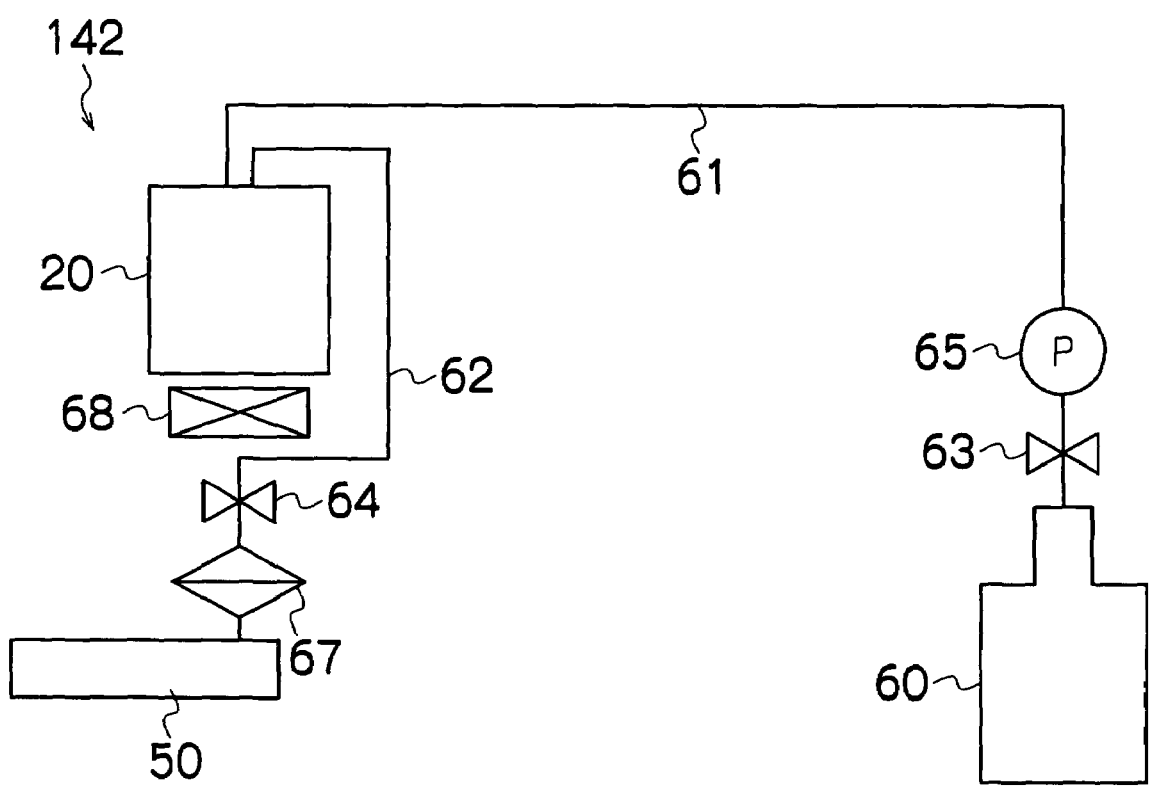
FIG. 2 is a schematic drawing showing an embodiment of a liquid supply unit of the image forming apparatus shown in FIG. 1.

FIG. 2 is a general schematic drawing showing one embodiment of the liquid supply unit 142 of the image forming apparatus 10.

In FIG. 2, a first valve 63 and an ink supply pump 65 are provided in a first liquid supply channel 61 leading from the main tank 60 forming the ink supply source to the sub tank 20 forming the liquid storage apparatus according to the present invention. When the first valve 63 is opened and the ink supply pump 65 is driven, ink is supplied from the main tank 60 to the sub tank 20.

A second valve 64 and a filter 67 are provided in a second liquid supply channel 62 leading from the sub tank 20 to the liquid ejection head 50. In the present embodiment, the pressure inside the sub tank 20, which forms the liquid storage apparatus and is described in detail below, or the height of ink in the sub tank 20 is adjusted so that: a certain back pressure (more specifically, a negative pressure which is able to maintain the meniscus inside the nozzles 51) is applied to the liquid ejection head 50 at normal times constantly; and ink is supplied to the liquid ejection head 50 from the sub tank 20 through the filter 67 when the second valve 64 is in an opened state.

Furthermore, a cooler 68 for cooling the sub tank 20 is provided below and in the vicinity of the sub tank 20.

Various embodiments of a sub tank 20 forming the liquid storage apparatus according to the present invention will be described in detail below.

First Embodiment

FIG. 3 is a cross-sectional diagram showing the internal structure of a sub tank 20A forming the liquid storage apparatus according to a first embodiment of the present invention.

As shown in FIG. 3, the sub tank 20A includes an external container 30 which is configured to accommodate a liquid storage chamber 21 constituted by a flexible bag member and which has concertina shaped side walls 302. In other words, a hermetically sealed space 304 is formed inside the external container 30 (more specifically, as shown in FIG. 3, a space is defined by the inner surface of the external container 30 and the outer surface of the liquid storage chamber 21). The liquid storage chamber 21 for storing the ink is accommodated in the hermetically sealed space 304 inside the external container 30. Since the liquid storage chamber 21 has flexibility, then the pressure inside the liquid storage chamber 21 is kept at substantially the same pressure as the pressure in the hermetically sealed space 304.

A shape memory member 40 having a concertina shape is disposed in the side walls 302 of the external container 30.

Examples of the material of the shape memory member 40 include: alloys such as Ni—Ti alloy, Cu—Al—Ni alloy, and Cu—Zn—Al alloy; and polymers such as a polynorbornene, and a trans polyisoprene. In the embodiments described below (including this embodiment), the material of the shape memory member 40 is an alloy (a shape memory alloy).

A heater (hereinafter, referred to as "external container heater") 31 for heating the shape memory member 40 is provided on the side walls 302 of the external container 30, in such a manner that the external container heater 31 follows the shape memory member 40. The temperature of the shape memory member 40 can be controlled by changing the electrical current flowing in the external container heater 31.

Furthermore, as described above with reference to FIG. 2, the cooler 68 for cooling the external container 30 is provided to the outer side of the external container 30.

A forcing member 32 composed of a spring is affixed to the bottom plate 301 of the external container 30 at one end of the forcing member 32, and the forcing member 32 is also affixed to the ceiling plate 303 of the external container 30 at the other end. In this manner, the forcing member 32 constantly applies a contraction force to the concertina side walls 302 of the external container 30 so that the concertina side walls 302 are forced to be contracted in the height direction (the vertical direction in the FIG. 3) at all times. More specifically, by means of the forcing member 32, the side walls 302 of the external container 30 are subject to contraction force at all times, in such a manner that the capacity of the hermetically sealed space 304 in the external container 30 may be reduced.

The shape memory member 40 is formed in a concertina shape and is made from shape memory material. The shape memory member 40 has properties whereby: the shape memory member 40 freely contracts and extends when cooled to a temperature not greater than the martensitic transformation start temperature (also referred to as the "Ms point" or "transformation temperature"); and the shape memory member 40 recovers a previously memorized shape when heated to a temperature equal to or greater than an austenitic transformation end temperature (also referred to as the "Af point", "reverse transformation temperature", or "shape recovery temperature"). A portion of the shape memory member 40 which has temperatures equal to or less than the transformation temperature and is freely extensible and contractive, is contracted by the contraction force of the forcing member 32. In accordance with this contraction of the portion of the shape memory member 40, the capacity of the external container 30 is reduced, the capacity of the hermetically sealed space 304 of the external container 30 and the capacity of the liquid storage chamber 21 are reduced, and the pressure in the liquid storage chamber 21 is thereby raised. On the other hand, a portion of the shape memory member 40 which has temperatures equal to or greater than the shape recovery temperature, seeks to recover the memorized shape which is more extended. In accordance with this extension of the portion of the shape memory member 40, the capacity of the external container 30 increases, the capacity of the hermetically sealed space 304 of the external container 30 and the capacity of the liquid storage chamber 21 are increased, and the pressure of the liquid storage chamber 21 is thereby reduced.

The liquid storage chamber 21 is connected to the first liquid supply channel 61 and the second liquid supply channel 62, via a connecting chamber 22 which is adjacent to and connected to the liquid storage chamber 21. Ink is supplied from the main tank 60 shown in FIG. 2 to the liquid storage chamber 21, via the first liquid supply channel 61, and the ink is then supplied from the liquid storage chamber 21 to the liquid ejection head 50 shown in FIG. 2, via the second liquid supply channel 62. An ink temperature sensor 23 for measuring the temperature of the ink is provided in the connecting chamber 22.

The external container 30 is provided with a pressure sensor 33 for measuring the pressure in the hermetically sealed space 304 of the external container 30, a temperature sensor (hereinafter, referred to as "external container temperature sensor") 34 for measuring the temperature of the side walls 302 of the external container 30, and a proximity sensor (hereinafter, referred to as "ink remainder sensor") 35 for measuring the remaining amount of ink in the liquid storage chamber 21.

Since the pressure inside the liquid storage chamber 21 is substantially the same as the pressure in the hermetically sealed space 304 of the external container 30, then by measuring the pressure in the hermetically sealed space 304 of the external container 30 by means of the pressure sensor 33, the pressure inside the liquid storage chamber 21 can be estimated.

Since the temperature of the shape memory member 40 is substantially the same as the temperature of the side walls 302 and the bottom plate 301 of the external container 30, then the temperature of the shape memory member 40 can be estimated by means of the external container temperature sensor 34 which is disposed inside the side walls 302 (or the bottom plate 301) of the external container 30.

The temperature of the ink inside the liquid storage chamber 21 and the temperature of the ink supplied from the liquid storage chamber 21 to the liquid ejection head 50 in FIG. 2 are measured by the ink temperature sensor 23 disposed in the connecting chamber 22 which is connected to the liquid storage chamber 21.

Possible embodiments of the material of the liquid storage chamber 21 are, for example, polyethylene, polyethylene terephthalate, nylon, aluminum foil, an ethylene-vinylalcohol copolymer (EVOH), and the like. It is also possible to use a multi-layer sheet formed by coupling together a plurality of sheets each of which is made from a material selected from these materials. The liquid storage chamber 21 has a thickness of 0.1 to 1.0 mm, for example.

The base material of the external container 30 is rubber, for example. Preferably, the ceiling plate 303 of the external container 30 is made from a material having thermal insulating properties.

In the first embodiment, the shape memory member 40 is formed by joining together shape memory members 41, 42 and 43 having mutually different transformation temperatures (Ms points) and mutually different shape recovery temperatures (Af points).

For the sake of the simple explanation, an embodiment is described below in which the transformation temperatures (Ms points) are close to the shape recovery temperatures (Af points).

In FIGS. 3 and 4, the relationship among the transformation temperature (which is substantially the same as the shape recovery temperature) t1 of the first shape memory member 41, the transformation temperature (shape recovery temperature) t2 of the second shape memory member 42, and the transformation temperature (shape recovery temperature) t3 of the third shape memory member 43, is represented as follows: t1<t2<t3. Each of the transformation temperatures t1, t2 and t3 is set to a temperature (for example, 40 to 50° C.) that is sufficiently higher than room temperature.

FIG. 3 shows a case where the temperature of the side walls 302 of the external container 30 is less than t1, in other words, a case where the temperatures of all of the members 41, 42 and 43 constituting the shape memory member 40 are lower than the respective shape recovery temperatures. Hence, all of the members 41, 42 and 43 assume a contracted state, due to the contraction force of the forcing member 32.

FIG. 4 shows a case where the shape memory member 40 is heated by the external container heater 31 and the temperature t of the side walls 302 of the external container 30 is thereby raised in such a manner that the following expression is satisfied: t1≦t<t2. In other words, the temperature t of the side walls 302 becomes equal to or exceeds the shape recovery temperature of the first shape memory member 41 constituting the shape memory member 40, and hence only the first shape memory member 41 recovers its memorized shape. On the other hand, the temperature t of the side walls 302 still remains below the shape recovery temperatures of the other shape memory members 42 and 43, and hence the recovery of the memorized shapes of the shape memory members 42 and 43 does not occur. In this state, only the first shape memory member 41 extends and recovers its memorized shape, while the second shape memory member 42 and the third shape memory member 43 remain in a contracted state due to the contraction force of the forcing member 32.

Figure 5:
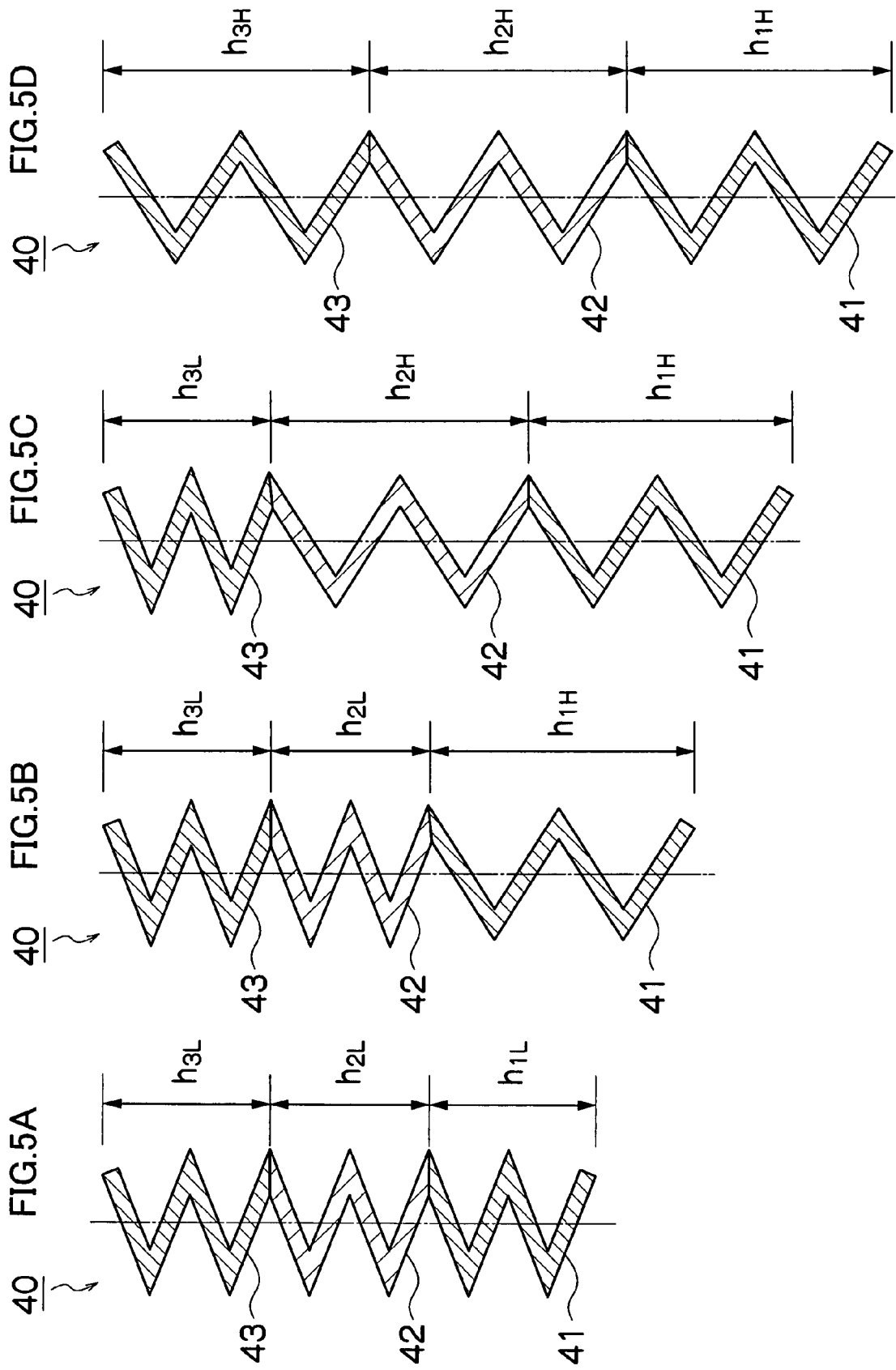
FIGS. 5A to 5D are enlarged diagrams for describing the extension of an example of a shape memory member.

FIG. 5A shows an enlarged view of the shape memory member 40 in a state where the following relationship is satisfied as shown in FIG. 3: t<t1. FIG. 5B shows an enlarged view of the shape memory member 40 in a state where the following relationship is satisfied as shown in FIG. 4: t1≦t<t2. FIG. 5C shows a state where the following relationship is satisfied: t2≦t<t3, and in other words, FIG. 5C shows a state where: the shape memory member 40 is heated to a temperature equal to or greater than the shape recovery temperatures t1 and t2 of the shape memory members 41 and 42; and the shape memory members 41 and 42 recover their memorized shapes and are in their extended states while only the shape memory member 43 remains in a contracted state due to the contraction force of the forcing member 32. FIG. 5D shows a state where t3≦t, in other words, a state where: the shape memory member 40 is heated to a temperature equal to or greater than the shape recovery temperatures of the shape memory members 41, 42 and 43; and all the shape memory members 41, 42, and 43 recover their memorized shapes and are in their extended states.

As shown in FIGS. 5A to 5D, the following relationships are satisfied: $h_{1L}<h_{1H}$; $h_{2L}<h_{2H}$; and $h_{3L}<h_{3H}$. When the temperature of the side walls 302 of the external container 30 is raised and the height (length) of the shape memory member 40 is changed, from FIG. 5A to FIG. 5B, from FIG. 5B to FIG. 5C, and from FIG. 5C to FIG. 5D, then the increments of the height of the side walls 302 of the external container 30 are $(h_{1H}-h_{1L})$, $(h_{2H}-h_{2L})$, and $(h_{3H}-h_{3L})$, respectively. The capacity of the external container 30 changes in accordance with this change in the height (length) of the side walls 302 of the external container 30, and consequently the pressure in the hermetically sealed space 304 and the pressure inside the liquid storage chamber 21 also change.

The shape memory members 41, 42, and 43 having mutually different transformation temperatures may be fabricated by varying the alloy compositions, processing method, heat treatment conditions, and the like.

Figure 6:
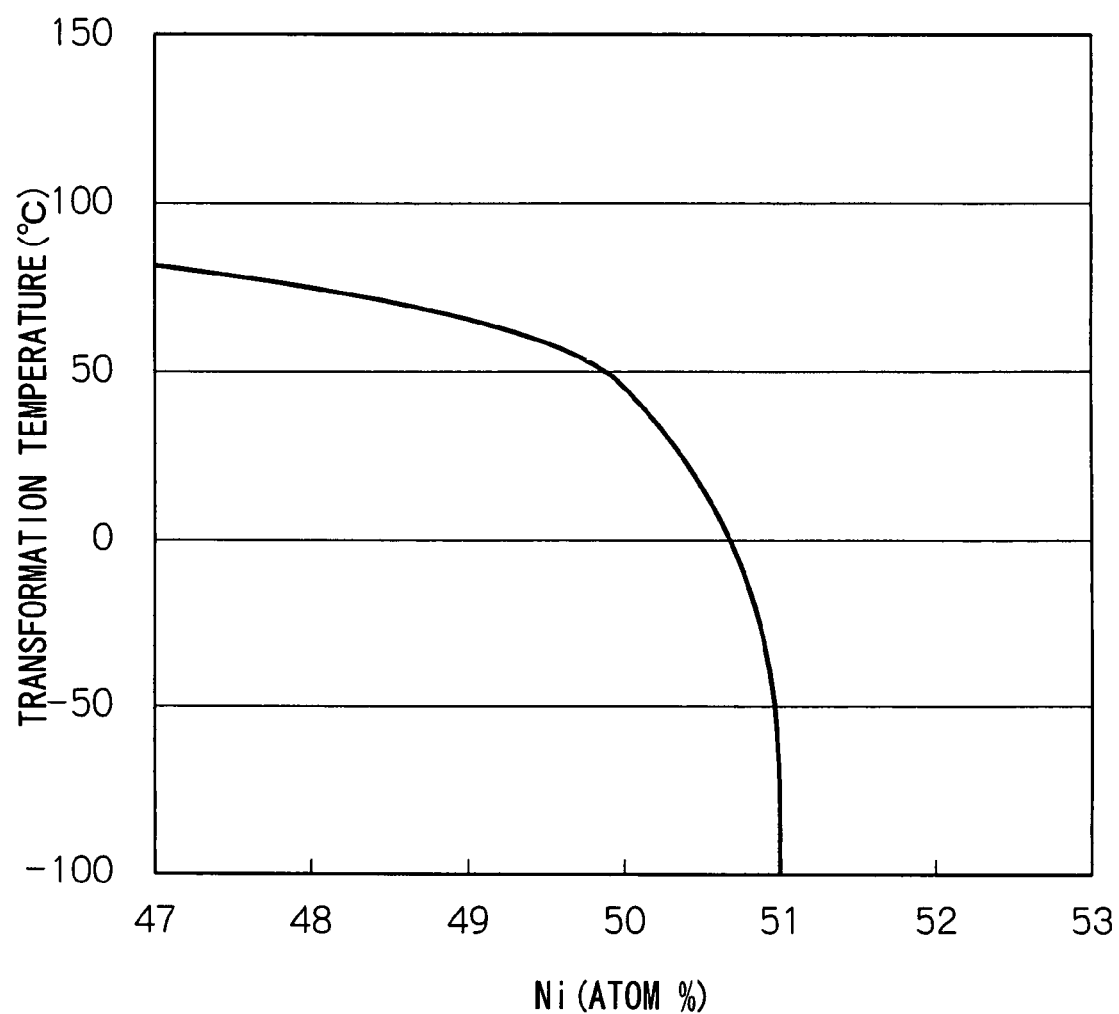
FIG. 6 is a diagram showing the relationship between the composition of the shape memory member and the transformation temperature.

FIG. 6 shows the relationship between the Ni composition (unit: atom %) contained in a shape memory alloy composed of Ni and Ti, and the transformation temperature thereof. In FIG. 6, by changing the Ni composition from 50.4 to 49.8 atom %, it is possible to adjust the transformation temperature between 25° C. and 50° C., at the least. The shape memory members 41, 42 and 43 having mutually different transformation temperatures are formed by finely adjusting the Ni composition (atom %), and the shape memory members 41, 42, and 43 respectively having transformation temperatures of 40° C., 45° C. and 50° C. can be obtained. Moreover, by adding (or substituting) alloy elements other than Ni and Ti, for example V, Cr, Mn, Fe, Co, at a rate of several atom %, it is possible to lower the transformation temperature of the shape memory alloy. By adjusting the composition of the elements in this way, it is possible to obtain the shape memory members 41, 42, and 43 having mutually different transformation temperatures.

In the case of Ni—Ti alloy, in general, it is possible to vary the transformation temperature from 5 to 100° C. In the case of a Cu—Zn—Al alloy, in general, it is possible to vary the transformation temperature from −100 to 100° C.

In practice, the transformation temperature is determined on the basis of the ink solvent to be used. It should be noted that the range of the transformation temperature is limited according to factors such as the boiling point of the ink solvent, the temperature range corresponding to the tolerable range of the amount of dissolved gas, the melting point, and the like.

Figure 7:
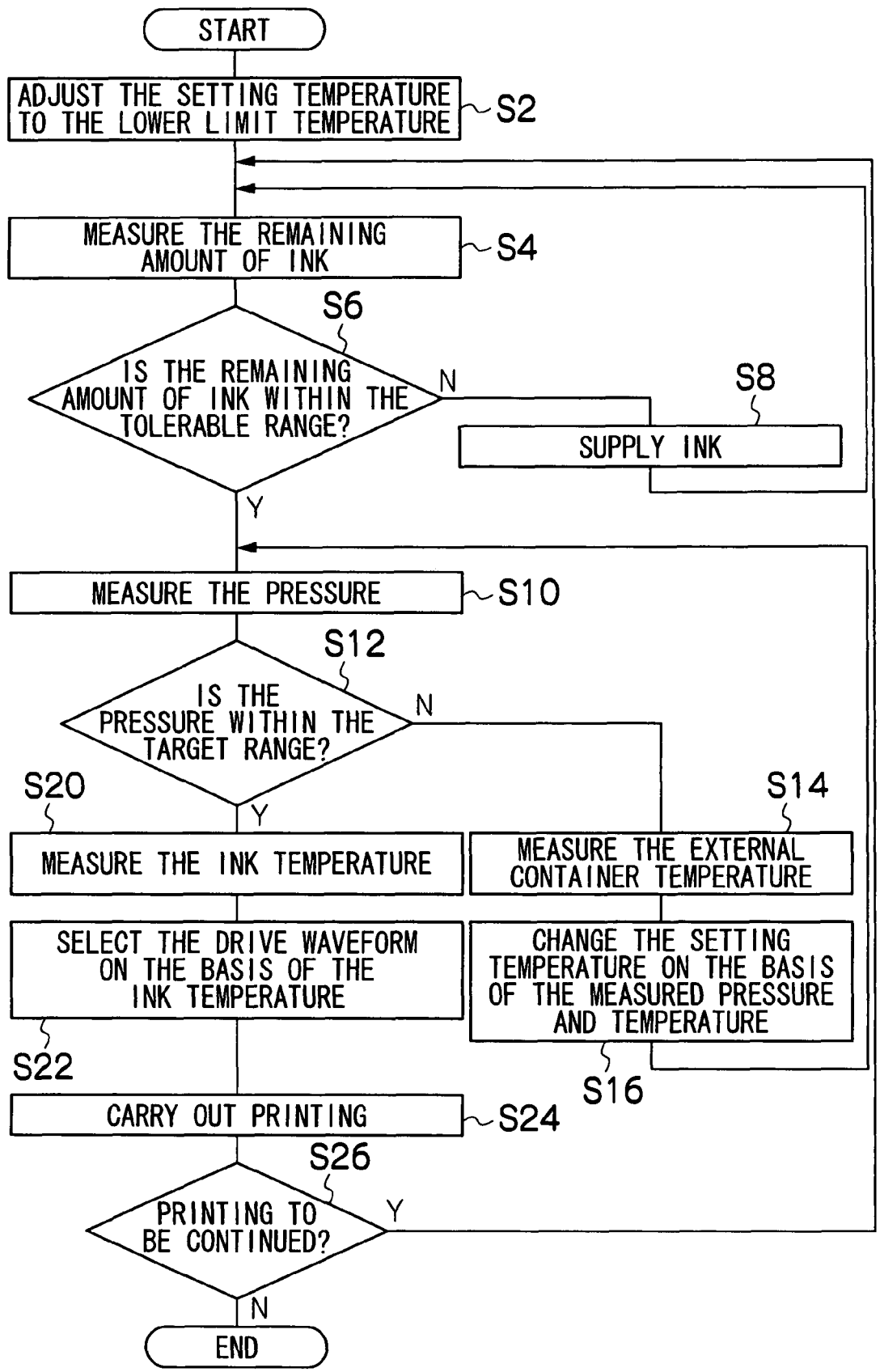
FIG. 7 is a flowchart showing the sequence of an example of pressure control processing according to the first embodiment.

FIG. 7 is a flowchart showing an embodiment of the sequence of processing (pressure control processing) for adjusting the temperature of the shape memory member 40 shown in FIG. 3, to control the pressure inside the liquid storage chamber 21. This pressure control process is carried out by means of the liquid supply control unit 144 shown in FIG. 1, in accordance with a prescribed program.

Firstly, the setting temperature of the external container 30 (the setting temperature of the shape memory member 40) is set to the lower limit temperature (S2). In this case, the cooler 68 is driven.

Thereupon, the remaining amount of ink in the liquid storage chamber 21 is measured by the ink remainder sensor 35 (S4), and it is judged whether or not the remaining amount of ink in the liquid storage chamber 21 falls within a prescribed tolerable range (S6). More specifically, it is judged whether or not the remaining amount of ink is equal to or greater than a tolerable value for the remaining amount of ink which is previously stored in the memory 152 shown in FIG. 1.

If the remaining amount of ink in the liquid storage chamber 21 is smaller than the tolerable value, then the ink supply pump 65 in FIG. 2 is driven so as to supply ink from the main tank 60 to the liquid storage chamber 21 (S8), and the procedure then returns to step S4.

On the other hand, if the remaining amount of ink in the liquid storage chamber 21 is equal to or greater than the tolerable value, then the pressure in the hermetically sealed space 304 of the external container 30 is measured by the pressure sensor 33 (S11), and it is then judged whether or not the measured pressure falls within a target range (S12). Here, the measured pressure is substantially the same as the pressure inside the liquid storage chamber 21. More specifically, it is judged whether or not the pressure measured by the pressure sensor 33 falls within a range from a lower pressure limit value to an upper pressure limit value stored previously in the memory 152 in FIG. 1.

If the measured pressure is out of the target range, then the temperature of the external container 30 is measured by the external container temperature sensor 34 (S14), and the external container heater 31 and the cooler 68 are used so as to change the temperature of the external container 30 (in other words, the temperature of the shape memory member 40) (S116), on the basis of the pressure in the external container 30 measured at step S110 and the temperature of the external container 30 measured at step S14.

More specifically, if the increase in the remaining amount of ink causes the pressure in the hermetically sealed space 304 of the external container 30 to become large to the extent that the measured pressure exceeds the upper limit value, then the setting temperature of the external container heater 31 is adjusted to a temperature greater than the temperature measured by the external container temperature sensor 34, resulting in the increase of the temperature of the shape memory member 40 constituting the side walls 302 of the external container 30. Out of the members 41, 42 and 43 constituting the shape memory member 40, a shape memory member which has a temperature equal to or above its shape recovery temperature, deforms against the contraction force of the forcing member 32 and assumes an extended memorized shape. In such a case, the capacity of the external container 30 increases and the pressure inside the liquid storage chamber 21 decreases.

If the decrease in the remaining amount of ink causes the pressure inside the hermetically sealed space 304 of the external container 30 to become small to the extent that the measured pressure is below the lower limit value, then the setting temperature of the external container heater 31 is adjusted to a temperature less than the temperature measured by the external container temperature sensor 34 and the cooler 68 is driven, resulting in the decrease of the temperature of the shape memory member 40 constituting the side walls 302 of the external container 30. Out of the members 41, 42, 43 constituting the shape memory member 40, a shape memory member which has a temperature equal to or less than its transformation temperature, deforms in the contractible direction due to the contraction force of the forcing member 32. In such a case, the capacity of the external container 30 decreases and the pressure inside the liquid storage chamber 21 increases.

If the pressure in the hermetically sealed space 304 of the external container 30 is within the intended range, then the ink temperature (in other words, the temperature of the ink to be supplied to the liquid ejection head 50 in FIG. 2) is measured by the ink temperature sensor 23 (S20), the drive waveform for the liquid ejection head 50 is adjusted (selected) on the basis of the ink temperature thus measured (S22), and printing is then carried out by the liquid ejection heads 50 (S24). For example, if the measured ink temperature is lower than a previously established reference value, then the drive voltage applied to the liquid ejection head 50 is raised, and on the other hand, if the measured ink temperature is higher than a previously established reference value, then the drive voltage applied to the liquid ejection head 50 is reduced.

In the present embodiment, although the ink temperature is measured by means of the ink temperature sensor 23 provided in the sub tank 20A, the invention is not limited in particular to cases of this kind, and it is also possible to provide such an ink temperature sensor in the liquid ejection head 50 or the liquid supply flow channel 62.

Thereupon, it is judged whether or not printing is to be continued (S26). If the printing is judged to be continued, then the procedure returns to step S4, whereas if the printing is judged not to be continued, the processing is terminated.

Second Embodiment

Figure 8:
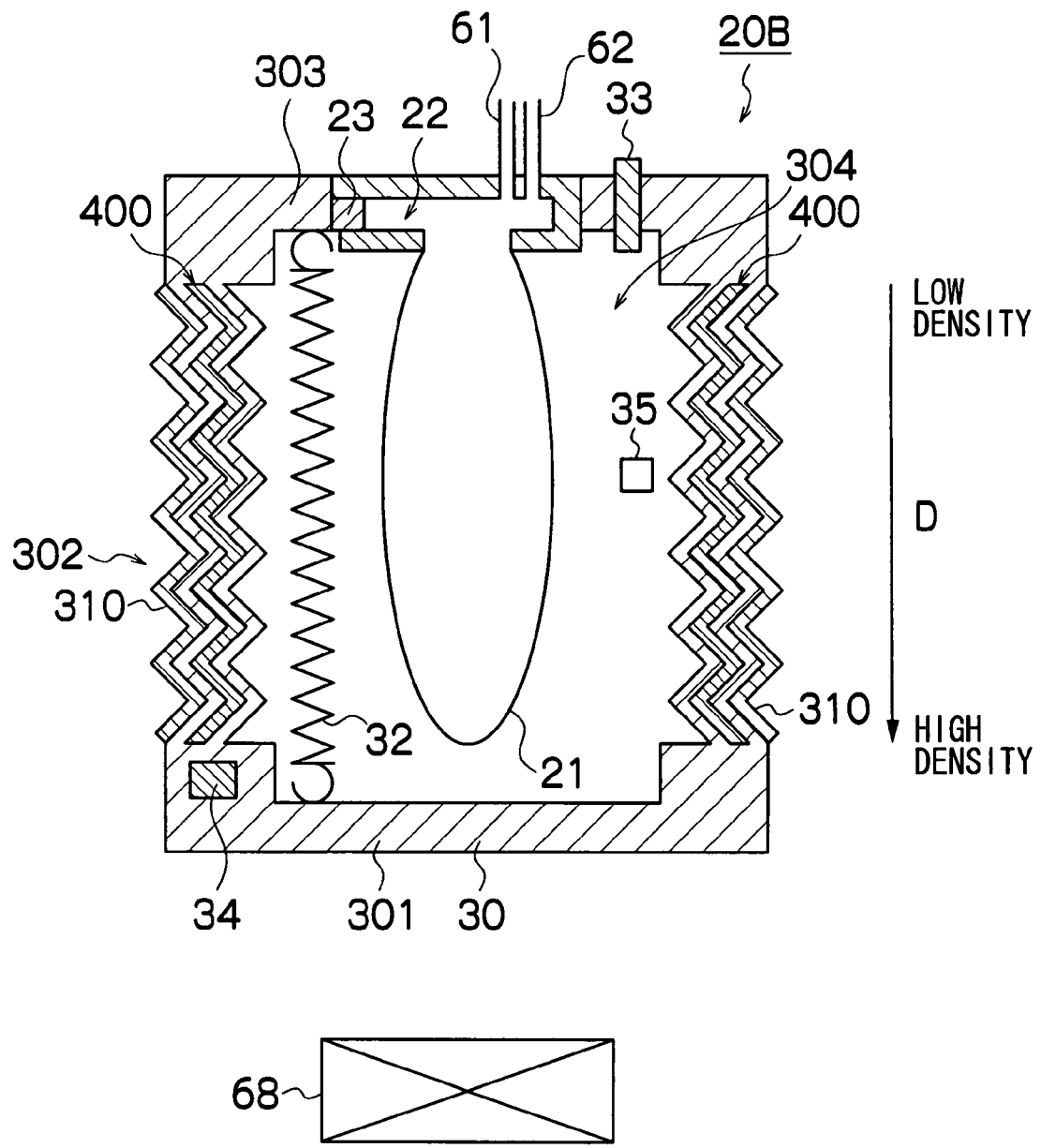
FIG. 8 is a cross-sectional diagram showing the internal structure of the liquid storage apparatus according to a second embodiment.

FIG. 8 is a cross-sectional diagram showing the internal structure of a sub tank 20B forming the liquid storage apparatus according to a second embodiment of the present invention. The same reference numerals are assigned to constituent elements which are the same as those of the sub tank 20A according to the first embodiment shown in FIG. 3, and the description of details already explained above is omitted here.

In FIG. 8, the shape memory member 400 provided in the side walls 302 of the external container 30 is a material that is uniform throughout from the upper end to the lower end. Hence, the transformation temperature and the shape recovery temperature are also uniform throughout the whole of the shape memory member 400.

Moreover, the external container heater 310 provided along the whole of the shape memory member 400 embedded in the side walls 302 of the external container 30, is constituted by electrical heating wires. The density of the electrical heating wires increases from low density to high density, as the position moves from the ceiling plate 303 of the external container 30 and toward the bottom plate 301, as indicated by the arrow D in FIG. 8.

When heated by means of the external container heater 310, the shape memory member 400 has a temperature distribution (temperature gradient) in which the temperature rises as the position moves away from the ceiling plate 303. Hence, the ratio of the portion of the shape memory member 400 having temperatures equal to or greater than the shape recovery temperature can be altered. Consequently, by changing the setting temperature (temperature distribution) of the external container heater 310 on the basis of the pressure in the hermetically sealed space 304 of the external container 30 measured by the pressure sensor 33, it is possible to alter the capacity of the external container 30 and thereby to adjust the pressure inside the liquid storage chamber 21 to a pressure within the target range.

Figure 9:
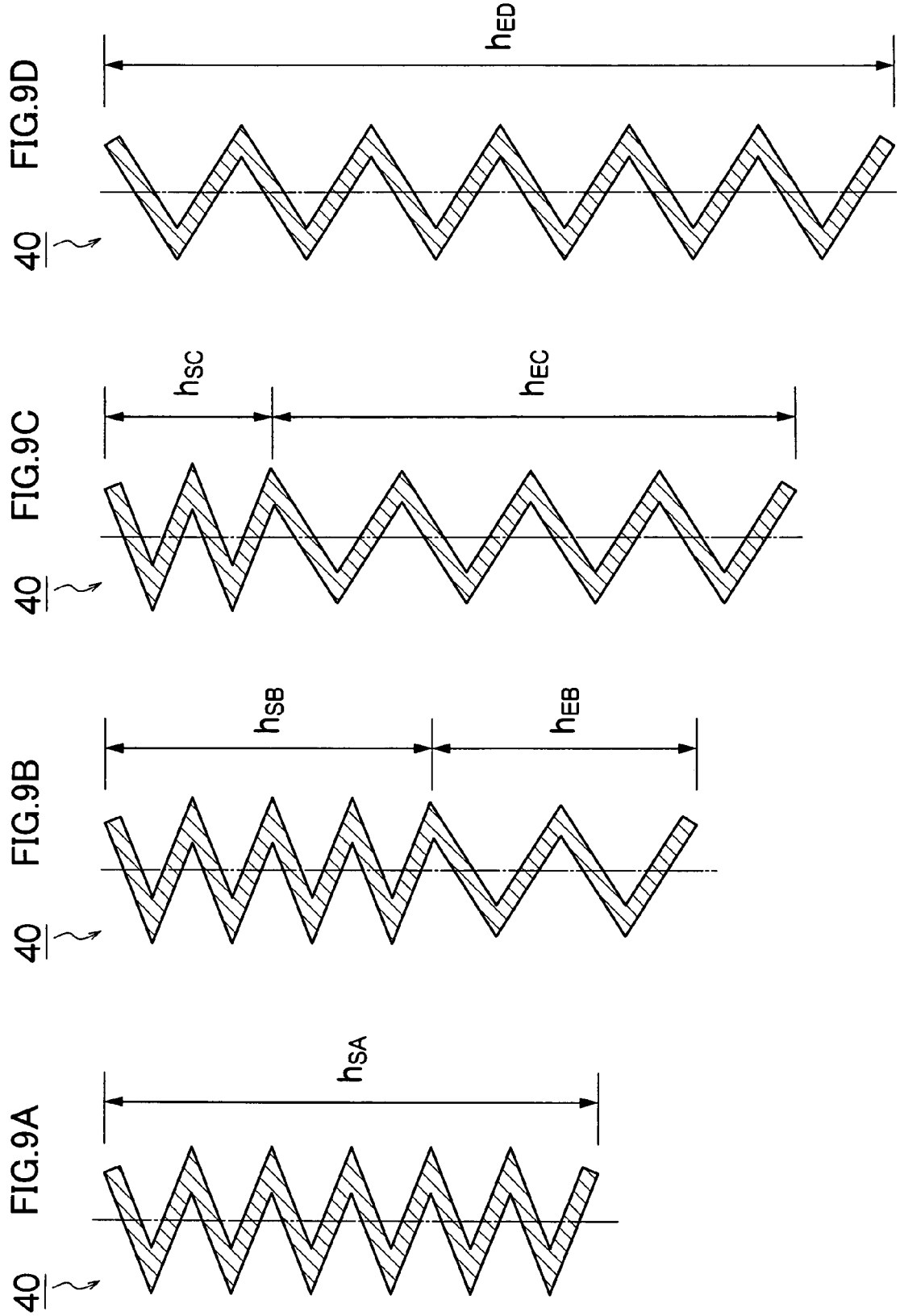
FIGS. 9A to 9D are enlarged diagrams for describing the extension of another example of the shape memory member.

In FIG. 8, the temperature of the whole shape memory member 400 is lower than the shape recovery temperature, and the whole of the shape memory member 400 assumes a contracted shape due to the contraction force of the forcing member 32. FIG. 9A is a diagram showing an enlarged view of this state of the shape memory member 400. When a current applied to the external container heater 310 is gradually increased and the setting temperature (temperature distribution) is shifted to the high temperature side, then the shape memory member 400 is gradually extended in the order of FIGS. 9A, 9B, 9C and 9D. In the state shown in FIG. 9B, the temperature in approximately one third of the shape memory member 400 has risen to a temperature equal to or greater than the shape recovery temperature and has recovered the extended shape; in the state shown in FIG. 9C, the temperature in approximately two thirds of the shape memory member 400 has risen to a temperature equal to or greater than the shape recovery temperature and has recovered the extended shape; and in the state shown in FIG. 9D, all of the shape memory member 400 has risen to a temperature equal to or greater than the shape recovery temperature and has recovered the extended shape. In FIG. 9A, the height (length) of the shape memory member 400 is equal to the height $h_{SA}$ of the contracted section; in FIG. 9B, the height of the shape memory member 400 is equal to the sum of the height $h_{SB}$ of the contracted section and the height $h_{EB}$ of the extended section; in FIG. 9C, the height of the shape memory member 400 is equal to the sum of the height $h_{SC}$ of the contracted section and the height $h_{EC}$ of the extended section; and in FIG. 9D, the height of the shape memory member 400 is equal to the height $h_{ED}$ of the extended section. Hence, the following relationship is satisfied: $h_{SA} < h_{SB} + h_{EB} < h_{SC} + h_{EC} < h_{ED}$. The increment rates in the height (length) of the shape memory member 400 are equal. As the temperature distribution (setting temperature) of the external container heater 310 is gradually shifted to the high temperature side, the ratio of the portion of the shape memory member 400 having a temperature equal to or greater than the shape recovery temperature increases progressively. In accordance with this change in this ratio (change in the size of this portion), the shape memory member 400 extends, the capacity of the external container 30 increases, and consequently the pressure in the liquid storage chamber 21 decreases.

Conversely, as the temperature distribution (setting temperature) of the external container heater 310 is gradually shifted to the lower temperature side, the ratio of the portion of the shape memory member 400 having a temperature equal to or less than the transformation temperature increases progressively. In accordance with this ratio (change in the size of this portion), the shape memory member 400 is contracted due to the contraction force of the forcing member 32, the capacity of the external container 30 decreases, and consequently the pressure in the liquid storage chamber 21 increases.

Third Embodiment

Figure 10:
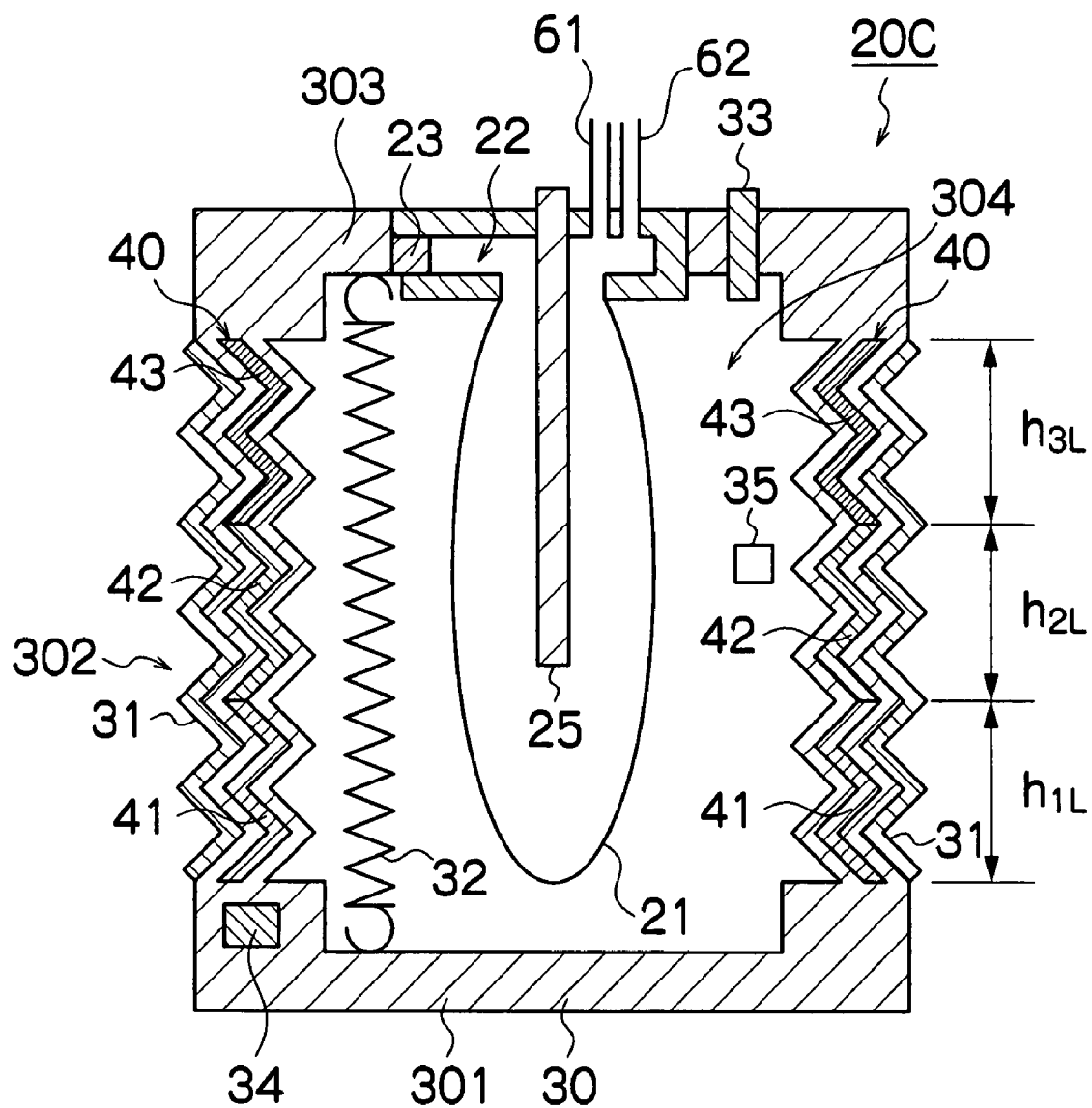
FIG. 10 is a cross-sectional diagram showing the internal structure of the liquid storage apparatus according to a third embodiment.

FIG. 10 is a cross-sectional diagram showing the internal structure of a sub tank 20C forming the liquid storage apparatus according to a third embodiment of the present invention. The same reference numerals are assigned to constituent elements which are the same as those of the sub tank 20A of the first embodiment shown in FIG. 3, and the description of details already explained above is omitted here.

In FIG. 10, a heater 25 for heating the ink in the liquid storage chamber 21 (hereinafter, referred to as "ink heater") is provided inside the liquid storage chamber 21. The ink heater 25 used in the present embodiment is rod shaped. The upper portion of the ink heater 25 is supported by the ceiling plate 303 of the external container 30, while the central portion and the lower portion thereof are disposed inside the liquid storage chamber 21 so as to come in contact with the ink inside the liquid storage chamber 21.

To give a brief description, the sub tank 20C according to the third embodiment includes two heaters, namely, the ink heater 25 and the external container heater 31, and the sub tank 20C differs in this respect from the sub tank 20A according to the first embodiment in which only the external container heater 31 is provided.

Figure 11:
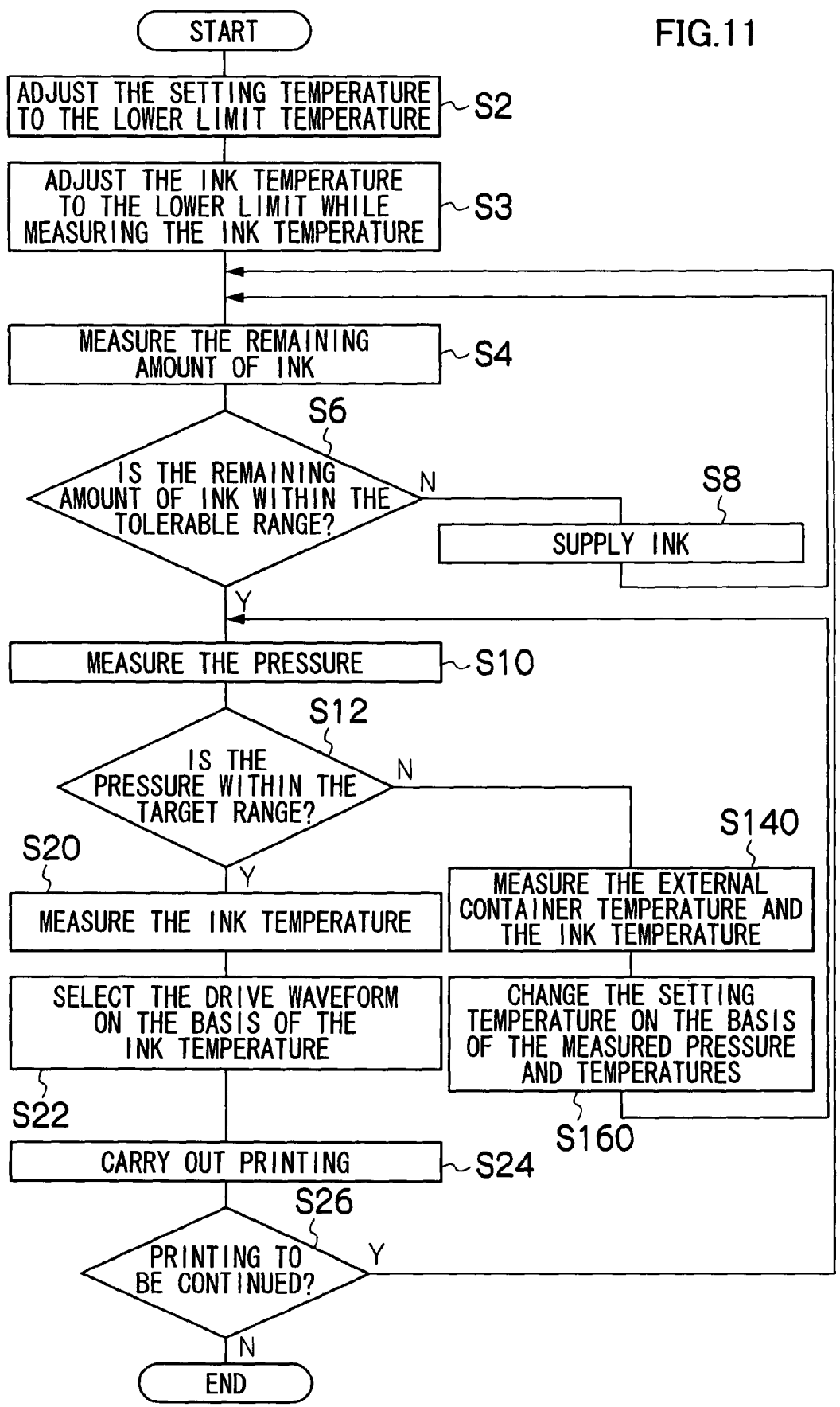
FIG. 11 is a flowchart showing the sequence of an example of the pressure control processing according to the third embodiment.

FIG. 11 is a flowchart showing one embodiment of the sequence of a pressure control process according to the third embodiment. This pressure control process is carried out by means of the liquid supply control unit 144 shown in FIG. 1, in accordance with a prescribed program.

Firstly, the temperature of the external container 30 (in other words, the temperature of the shape memory member 40) is adjusted to the lower limit temperature (S2). Thereupon, while the ink temperature is kept to be measured by means of the ink temperature sensor 23, the temperature of the ink inside the liquid storage chamber 21 is adjusted using the ink heater 25 so that the temperature of the ink becomes a previously established lower limit temperature.

The following processing for measuring the remaining amount of ink (S4), judging whether or not the remaining amount of ink is within a tolerable range (S6), supplying ink if the remaining amount of ink is not within the tolerable range (S8), measuring the pressure in the hermetically sealed space 304 of the external container 30 (S10), and judging whether or not the measured pressure is within a target range (S12), is the same as the processing in the first embodiment described above with reference to FIG. 7, and since these steps have already been explained above, then the detailed description is omitted here.

In the present embodiment, if the pressure in the hermetically sealed space 304 of the external container 30 is not within the target range, then the temperature of the external container 30 is measured by the external container temperature sensor 34 and the ink temperature is measured by the ink temperature sensor 23 (S140). Thereupon, on the basis of the pressure measured at step S10 and the temperatures measured at step S140, the temperatures of the external container 30 (in other words, the temperature of the shape memory member 40) and the ink inside the liquid storage chamber 21 are adjusted by means of the external container heater 31, the ink heater 25 and the cooler 68 (S160).

There are various modes for changing the temperatures (S160).

Firstly, the drive circuits for the external container heater 31 and the ink heater 25 may be composed in such a manner that the temperatures are adjusted by the combined actions of the external container heater 31 and the ink heater 25. Specifically, the external container heater 31, the ink heater 25 and the cooler 68 adjust mainly the temperature of the external container 30, on the basis of the pressure measured by the pressure sensor 33 and the temperature measured by the external container temperature sensor 34. In this case, the temperature change of the ink inside the liquid storage chamber 21 is kept within a previously established tolerance range. In this mode, it is possible to simplify the circuit composition and control.

Secondly, the drive circuits for the external container heater 31 and the ink heater 25 may be composed in such a manner that the temperatures are adjusted separately by the external container heater 31 and the ink heater 25. The temperatures of the external container 30 and the ink inside the liquid storage chamber 21 are adjusted separately and independently by using the external container heater 31, the ink heater 25 and the cooler 68, on the basis of the pressure measured by the pressure sensor 33 and the temperatures measured by the external container temperature sensor 34 and the ink temperature sensor 23. In this mode, since the external container 30 and the ink are heated independently by the heaters respectively, then it is possible to reduce the temperature change of the ink, and to improve the ejection reliability of the liquid ejection head 50.

The details of the processing in the steps (S20, S22 and S24) which are carried out when the internal pressure of the hermetically sealed space 304 of the external container 30 is within the target range, and the details of the processing in the printing continuation judgment step (S26), are the same as the details of the processing according to the first embodiment described above with reference to FIG. 7, and since these have already been explained above, then further description thereof is omitted here.

Fourth Embodiment

Figure 12:
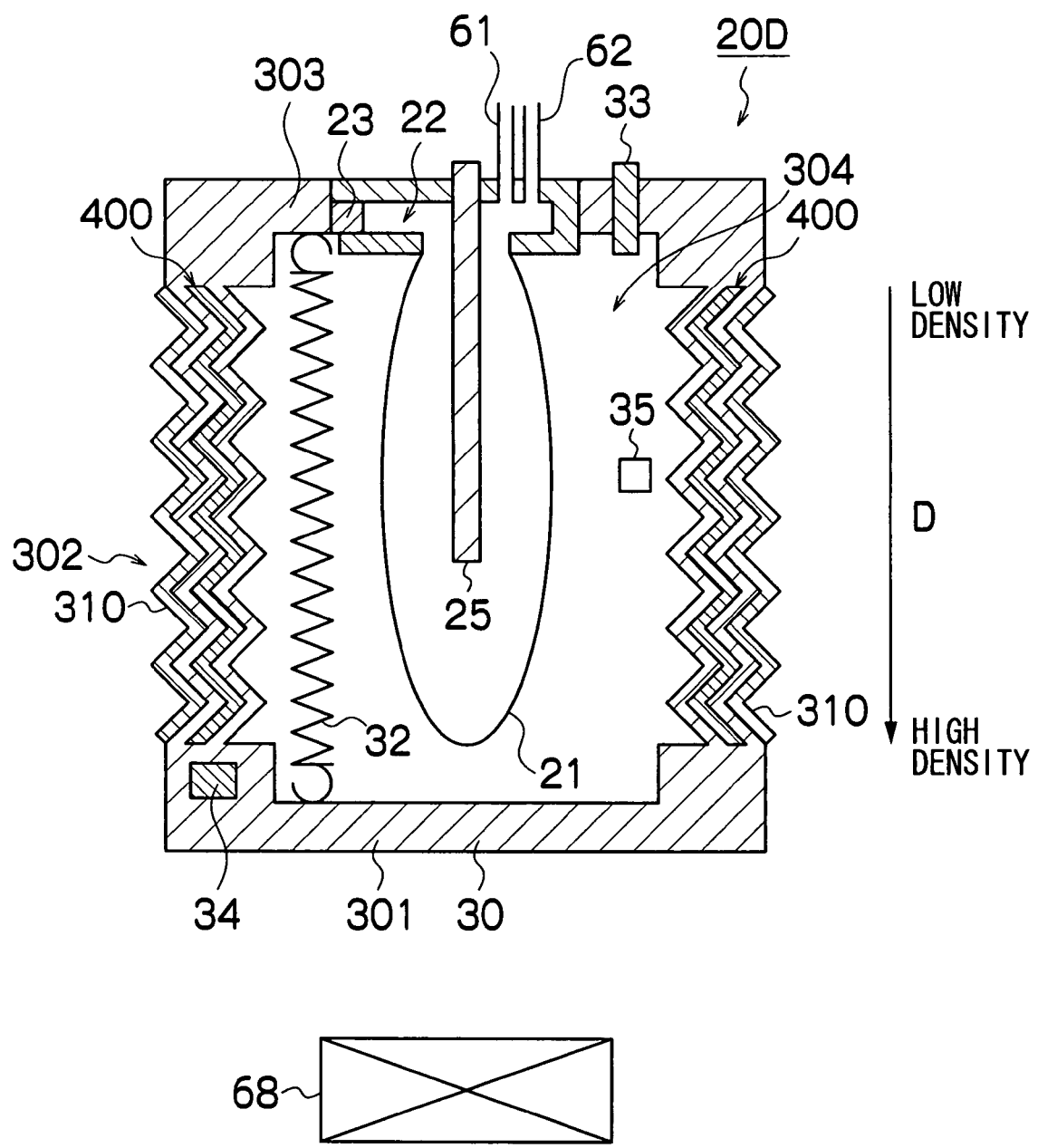
FIG. 12 is a cross-sectional diagram showing the internal structure of the liquid storage apparatus according to a fourth embodiment.

FIG. 12 is a cross-sectional diagram showing the internal structure of a sub tank 20D forming the liquid storage apparatus according to a fourth embodiment of the present invention. The same reference numerals are assigned to constituent elements which are the same as those of the sub tank 20C of the third embodiment shown in FIG. 10, and the description of details already explained above is omitted here.

In FIG. 12, the shape memory member 400 and the external container heater 310 are the same as those of the sub tank 20B according to the second embodiment, which is shown in FIG. 8. To give a brief description, throughout the whole of the shape memory member 400, the shape memory member 400 is made from a uniform material, and the transformation temperature and the shape recovery temperature are uniform. As indicated by the arrow D in FIG. 12, the external container heater 310 is constituted by electrical heating wires, and the density of the electrical heating wires increases from low density to high density, as the position moves from the ceiling plate 303 toward the bottom plate 301 of the external container 30. The sub tank 20D according to the fourth embodiment differs from the sub tank 20B according to the second embodiment in that the sub tank 20D includes the ink heater 25.

Fifth Embodiment

FIG. 13 is a cross-sectional diagram showing the internal structure of a sub tank 20E forming the liquid storage apparatus according to a fifth embodiment of the present invention. The same reference numerals are assigned to constituent elements which are the same as those of the sub tank 20C of the third embodiment shown in FIG. 10, and the description of details already explained above is omitted here.

In the sub tank 20E according to the present embodiment, which is shown in FIG. 13, in contrast to the sub tank 20C according to the third embodiment, no external container heater 31 is provided. Similarly to the sub tank 20C according to the third embodiment, the ink heater 25 is provided, and the shape memory member 40 of the side walls 302 of the external container 30 is heated indirectly by means of this ink heater 25. In other words, the ink heater 25 is used both for heating the ink and for heating the shape memory member 40.

Figure 14:
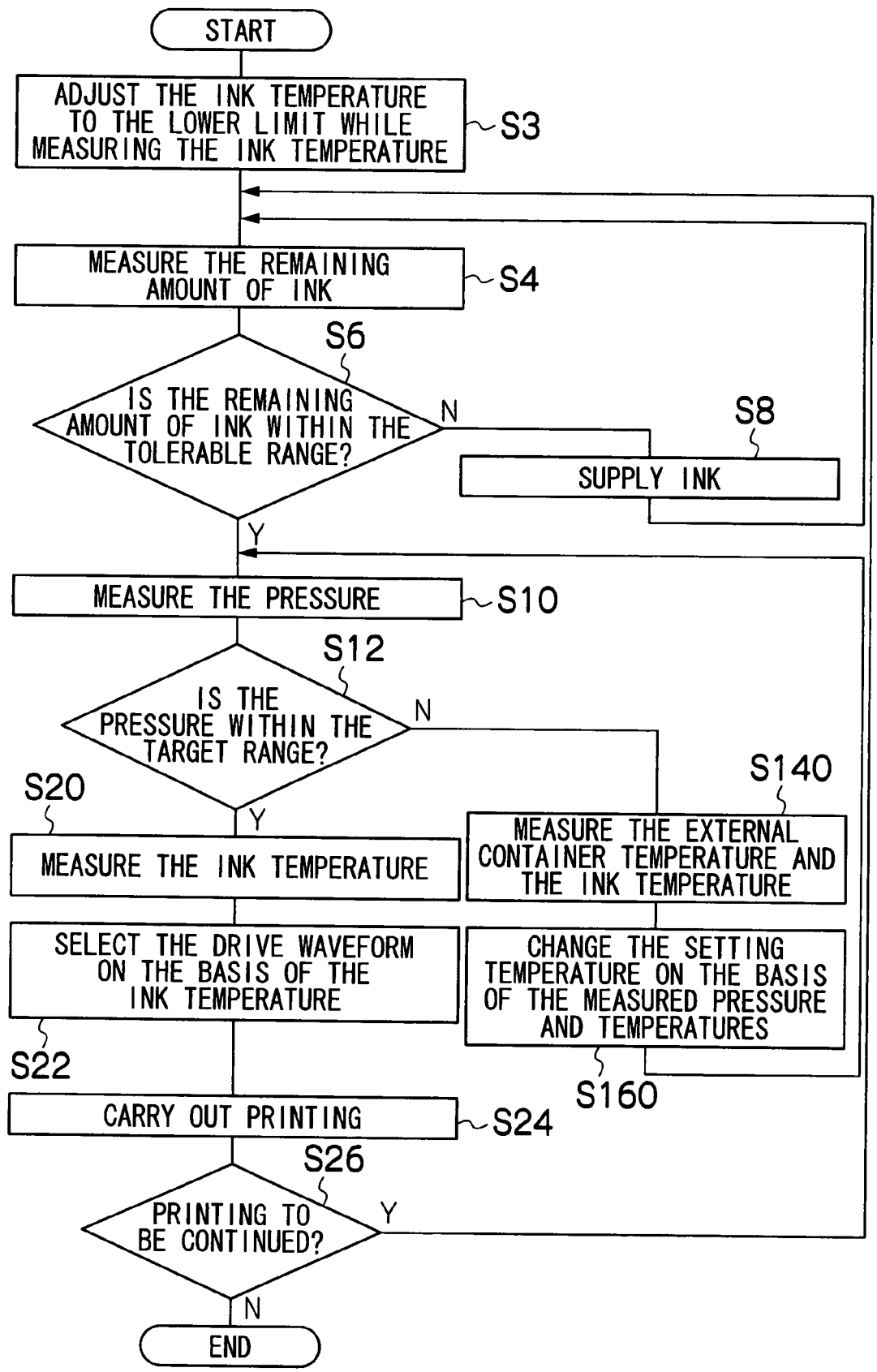
FIG. 14 is a flowchart showing the sequence of an example of the pressure control processing according to the fifth embodiment.

FIG. 14 is a flowchart showing one embodiment of the sequence of pressure control processing according to the fifth embodiment. This pressure control process is carried out by means of the liquid supply control unit 144 in FIG. 1, in accordance with a prescribed program.

Firstly, while the ink temperature is kept to be measured by means of the ink temperature sensor 23, the temperature of the ink inside the liquid storage chamber 21 is adjusted to a previously established lower limit temperature, by means of the ink heater 25. In this case, the temperature of the external container 30 (in other words, the temperature of the shape memory member 40) is adjusted to the lower limit temperature.

The following processing for measuring the remaining amount of ink (S4), judging whether or not the remaining amount of ink is within a tolerable range (S6), supplying ink if the remaining amount of ink is not within the tolerable range (S8), measuring the pressure in the hermetically sealed space 304 of the external container 30 (S10), and judging whether or not the measured pressure is within a target range (S12), is the same as the processing in the first embodiment described above with reference to FIG. 7, and since this processing has already been explained above, then the detailed description is omitted here.

In the present embodiment, if the pressure in the hermetically sealed space 304 of the external container 30 is not within the target range, then the temperature of the external container 30 and ink temperature are measured by the external container temperature sensor 34 and the ink temperature sensor 23, respectively (S140). On the basis of the pressure measured at step S10 and the temperatures measured at step S140, the ink heater 25 and the cooler 68 change mainly the temperature of the external container 30. In this case, the temperature change of the ink inside the liquid storage chamber 21 is kept within the previously established tolerance range.

The details of the processing in the steps (S20, S22 and S24) carried out when the internal pressure of the hermetically sealed space 304 of the external container 30 is within the target range, and the details of the processing in the printing continuation judgment step (S26), are the same as the details of the processing according to the first embodiment described above with reference to FIG. 7, and since these have already been explained above, further description thereof is omitted here.

Sixth Embodiment

Figure 15:
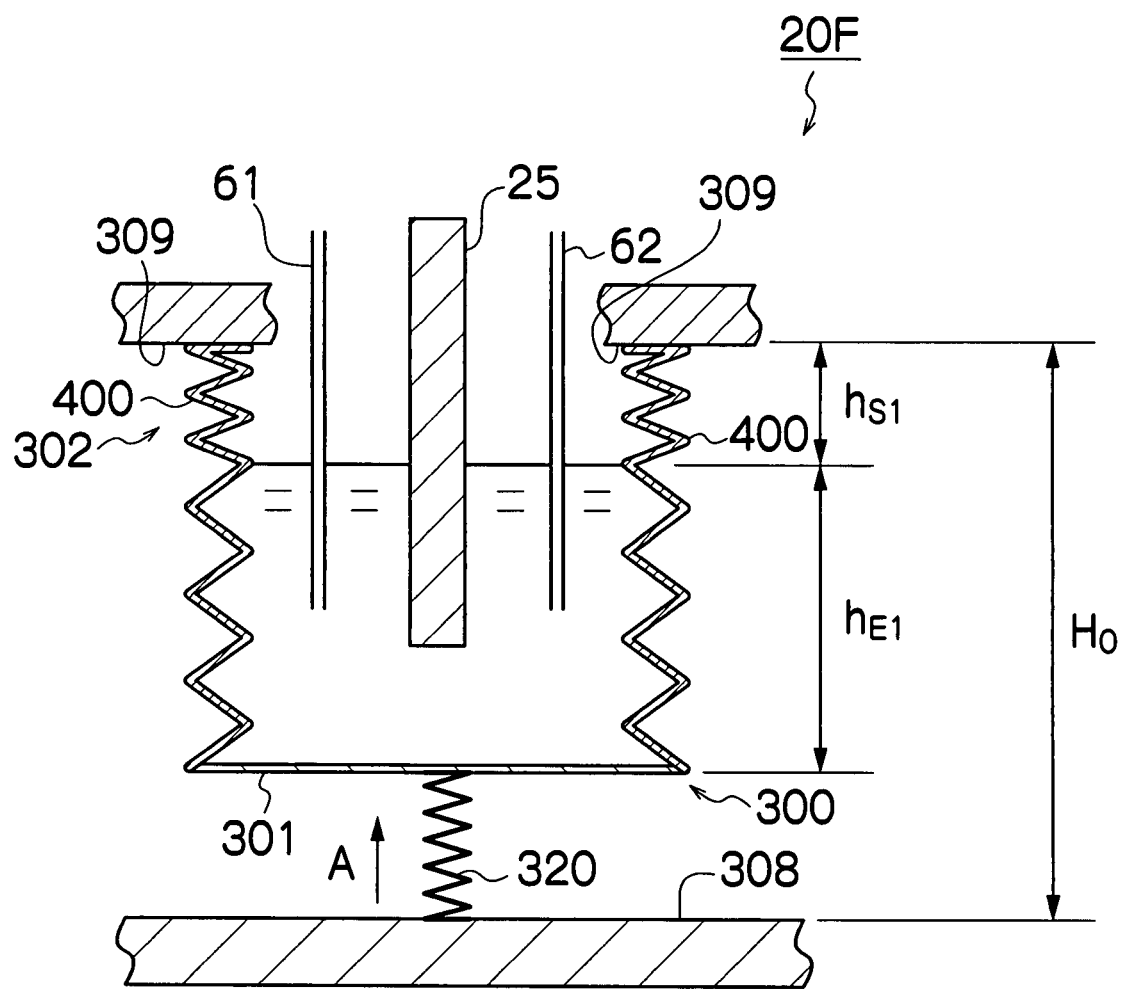
FIG. 15 is a first cross-sectional diagram showing the internal structure of the liquid storage apparatus according to a sixth embodiment.

FIG. 15 is a cross-sectional diagram showing the internal structure of an open atmosphere type of sub tank 20F forming the liquid storage apparatus according to a sixth embodiment of the present invention.

As shown in FIG. 15, the sub tank 20F includes: an open atmosphere type of liquid storage container 300 for storing ink supplied from the main tank 60 in FIG. 2 via the first liquid supply channel 61 and supplied to the liquid ejection head 50 in FIG. 2 via the second liquid supply channel 62; an ink heater 25 disposed inside the liquid storage container 300 and configured to heat the ink inside the liquid storage container 300; and an forcing member 320 for applying the contraction force to the liquid storage container 300 in the contracting direction indicated by arrow A in FIG. 15.

The shape memory member 400 is the same as that of the sub tank 20B according to the second embodiment shown in FIG. 8, and the shape memory member 400 is made from a uniform material.

The storage container 300 has side walls 302 constituted by the shape memory member 400. The lower ends of the side walls 302 of the storage container 300 (in other words, the lower ends of the shape memory member 400) are bonded to the bottom plate 301 of the storage container 300, whereas the upper ends of the side walls 302 of the storage container 300 (in other words, the upper ends of the shape memory member 400) abut against a reference surface 309 which is fixed at a height of $H_0$ from a supporting surface 308.

The forcing member 320 is constituted by a spring, for example. The upper end of the forcing member 320 abuts against the bottom plate 301 of the storage container 300, whereas the lower end of the forcing member 320 is supported by the supporting surface 308. In other words, the forcing member 320 applies the contraction force to the side walls 302 of the storage container 300 so that the side walls 302 are contracted in the direction A.

The ink heater 25 heats the ink inside the liquid storage container 300, and the temperature of the ink inside the liquid storage container 300 is adjusted to a temperature equal to or greater than the shape recovery temperature (Af point) of the shape memory member 400. The shape memory member 400 used in the present embodiment has a transformation temperature (Ms point) in the vicinity of the shape recovery temperature (Af point). When cooled to a temperature equal to or less than the transformation temperature (Ms point) by the atmosphere, or the like, the shape memory member 400 deforms to a contracted shape due to the contraction force of the forcing member 320. On the other hand, when heated to a temperature equal to or greater than the shape recovery temperature (Af point), via the ink, the shape memory member 400 recovers the specified memory shape which is more extended in comparison with the contracted shape assumed when the shape memory member 400 has a temperature equal to or below the transformation temperature. In this case, the portion of the shape memory member 400 which makes contact with the ink inside the liquid storage container 300 assumes an extended shape, whereas the portion which does not make contact with the ink assumes the contracted shape. In other words, the ink heater 25 indirectly adjusts the temperature of the shape memory member 400 via the ink, and the ink heater 25 thereby alters the ratio of the contracted shape portion in the shape memory member 400 and the ratio of the extended shape portion in the shape memory member 400.

Figure 16:
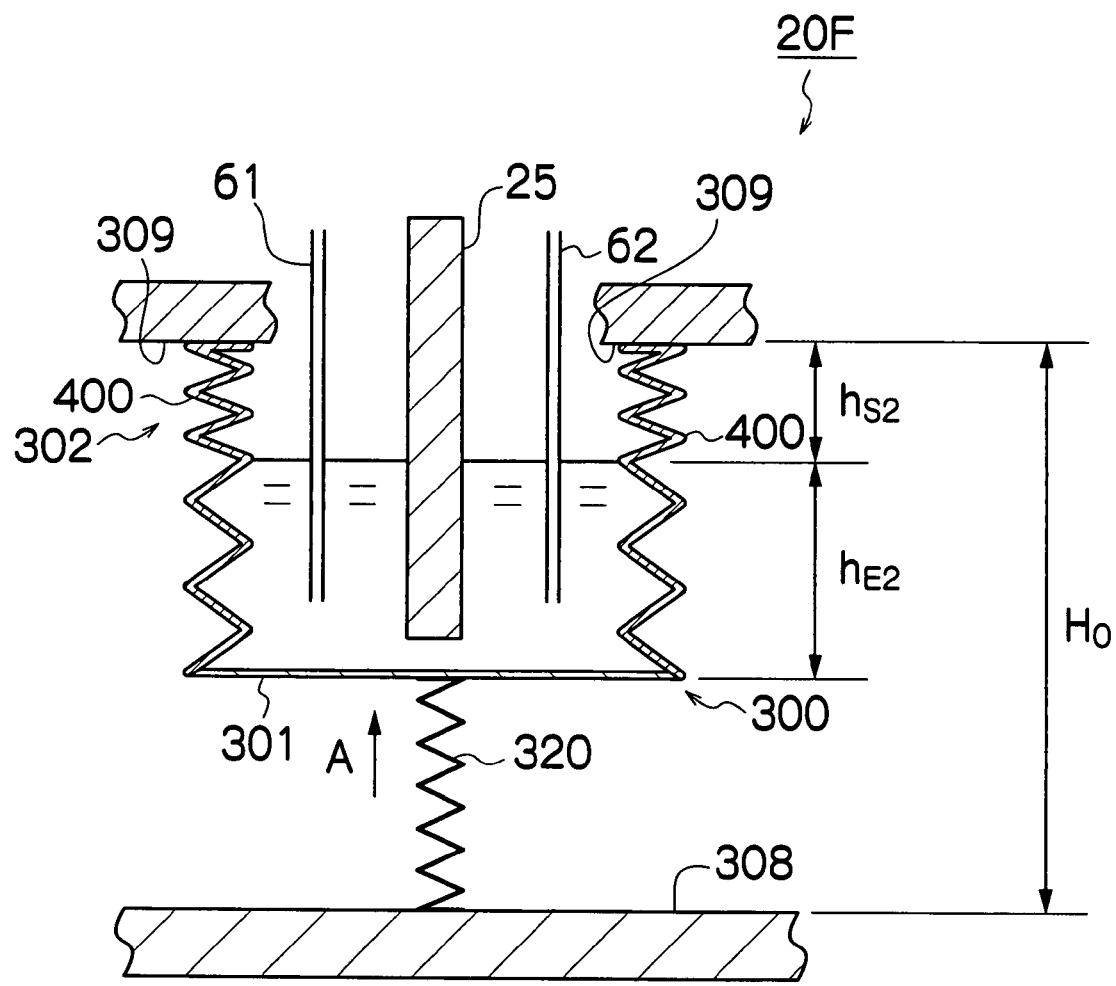
FIG. 16 is a second cross-sectional diagram showing the internal structure of the liquid storage apparatus according to the sixth embodiment.

As the ink inside the storage container 300 shown in FIG. 15 is consumed and the remaining amount of the ink in the storage container 300 decreases, then as shown in FIG. 16, the temperature of the region of the side walls 302 of the storage container 300 which does not make contact with the ink declines and becomes equal to or less than the transformation temperature. In this case, the side walls 302 of the storage container 300 are contracted due to the contraction force of the forcing member 320, and the bottom plate 301 of the storage container 300 is raised up, thereby maintaining the height of the liquid surface inside the storage container 300 within a prescribed tolerable range.

The following relationship is satisfied between the height $h_{E1}$ of the extended portion of the shape memory member 400 which lies in contact with the ink and has restored its shape in a state where the remaining amount of ink is large as shown in FIG. 15, and the height $h_{E2}$ of the extended portion of the shape memory member 400 which lies in contact with the ink and has restored its shape in a state where the remaining amount of ink is small as shown in FIG. 16: $h_{E1} > h_{E2}$. The following relationship is also satisfied between the height $h_{S1}$ of the contracted portion of the shape memory member 400 which does not lie in contact with the ink in the state where the remaining amount of ink is large as shown in FIG. 15, and the height $h_{S2}$ of the contracted portion of the shape memory member 400 which does not lie in contact with the ink in the state where the remaining amount of ink is small as shown in FIG. 16: $h_{S1} < h_{S2}$. Here, by configuring the shape memory member 400 to be sufficiently contractible at temperatures equal to or less than the transformation temperature (Ms point), then $|h_{E1} - h_{E2}|$ becomes sufficiently greater than $|h_{S1} - h_{S2}|$, and it is possible to sufficiently reduce the variation in the height of the liquid surface with respect to the reference surface 309, namely $|h_{S1} - h_{S2}|$, to a negligible level.

Furthermore, as ink is supplied to the storage container 300 shown in FIG. 16 and the remaining amount of ink in the storage container 300 increases, then as shown in FIG. 15, the temperature of the portion of the side walls 302 of the storage container 300 which lies in contact with the ink increases and becomes equal to or greater than the shape recovery temperature, the side walls 302 of the storage container 300 are extended against the contraction force of the forcing member 320, and the bottom plate 301 of the storage container 300 is lowered, thereby maintaining the height of the liquid surface inside the storage container 300 within the prescribed tolerable range.

The ink is heated directly in the sixth embodiment described above, but the present invention is not limited in particular to cases of this kind, and it is also possible to provide a heater heating the liquid storage container 300. In order to alter the ratio of the contracted portion of the shape memory member and the ratio of the extended portion of the shape memory member, there is a mode where the shape memory member is formed by joining together shape memory members having different transformation temperatures as described previously in the first embodiment, and there is a mode where electrical heating wires constituting a heater are formed in such a manner that the density of the wires changes from low density to high density, from the upper end toward the lower end of the heater as described in the second embodiment.

Embodiments of the present invention has been described in detail above, but the present invention is not limited to the embodiments described in the present specification, or the embodiments shown in the drawings, and it is of course possible for improvements or design modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A liquid storage apparatus, comprising:
   a liquid storage chamber which is constituted by a flexible bag member and stores liquid;
   an exterior container which has walls constituted by a shape memory member and has a hermetically sealed space in which the liquid storage chamber is disposed, the shape memory member extending and contracting freely at temperatures not greater than a transformation temperature and recovering a memorized shape at temperatures not less than a shape recovery temperature;

a forcing member which applies a contraction force to the walls of the exterior container in a direction in which the walls contract; and a temperature adjuster which adjusts a temperature of the shape memory member directly or indirectly so as to control a ratio of a portion of the shape memory member having temperatures not greater than the transformation temperature and deformed to a contracted shape by the contraction force of the forcing member, to a portion of the shape memory member having temperatures not less than the shape recovery temperature and recovering the memorized shape more extended than the contracted shape, so that a pressure in the liquid storage chamber is changed depending on a volume change of the exterior container due to deformation of the shape memory member.

2. The liquid storage apparatus as defined in claim 1, further comprising:

a pressure sensor which measures at least one of a pressure in the hermetically sealed space of the external container and the pressure in the liquid storage chamber;

a temperature sensor which measures at least one of a temperature of the external container and a temperature of the liquid stored in the liquid storage chamber; and a control unit which controls the temperature adjuster to adjust the temperature of the shape memory member according to the at least one of the pressure in the hermetically sealed space and the pressure in the liquid storage chamber measured by the pressure sensor and the at least one of the temperature of the external container and the temperature of the liquid in the liquid storage chamber measured by the temperature sensor in such a manner that the at least one of the pressure in the hermetically sealed space and the pressure in the liquid storage chamber measured by the pressure sensor falls within a target range.

3. The liquid storage apparatus as defined in claim 1, wherein the shape memory member of the external container is formed into a concertina shape.

4. The liquid storage apparatus as defined in claim 1, wherein the temperature adjuster includes an electrical heater arranged on the walls of the external container.

5. The liquid storage apparatus as defined in claim 1, wherein the temperature adjuster includes a first electrical heater arranged on the walls of the external container and a second electrical heater arranged in the liquid storage chamber.

6. The liquid storage apparatus as defined in claim 1, wherein:

the temperature adjuster includes an electrical heater arranged in the liquid storage chamber; and the shape memory member of the external container is heated indirectly by the electrical heater.

7. The liquid storage apparatus as defined in claim 1, wherein the shape memory member of the external container is formed by joining together a plurality of members made from shape memory materials having mutually different shape recovery temperatures.

8. The liquid storage apparatus as defined in claim 4, wherein the electrical heater arranged on the walls of the external container is constituted by electrical heating wires of which density is changed from one end to another end.

9. The liquid storage apparatus as defined in claim 5, wherein the first electrical heater arranged on the walls of the external container is constituted by electrical heating wires of which density is changed from one end to another end.

10. A liquid storage apparatus, comprising:

a liquid storage container having walls constituted by a shape memory member which extends and contracts freely at temperatures not greater than a transformation temperature and recovers a memorized shape at temperatures not less than a shape recovery temperature, the liquid storage container storing liquid which comes into contact with the walls;

a forcing member which applies a contraction force to the walls of the liquid storage container; and a temperature adjuster which adjusts temperature of the shape memory member directly or indirectly so as to control a ratio of a portion of the shape memory member having temperatures not greater than the transformation temperature and deformed to a contracted shape by the contraction force of the forcing member, to a portion of the shape memory member having temperatures not less than the shape recovery temperature and recovering the memorized shape more extended than the contracted shape, so that level of the liquid stored in the liquid storage container is changed depending on deformation of the shape memory member.

11. An image forming apparatus, comprising:

the liquid storage apparatus according to claim 1; and a liquid ejection head which ejects the liquid supplied from the liquid storage apparatus, toward an ejection receiving medium.

12. An image forming apparatus, comprising:

the liquid storage apparatus according to claim 10; and a liquid ejection head which ejects the liquid supplied from the liquid storage apparatus, toward an ejection receiving medium.

* * * * *